United States Patent
Munich et al.

(10) Patent No.: US 11,266,287 B2
(45) Date of Patent: Mar. 8, 2022

(54) CONTROL OF AUTONOMOUS MOBILE ROBOTS

(71) Applicant: iRobot Corporation, Bedford, MA (US)

(72) Inventors: Mario Munich, Bedford, MA (US); Philip Fong, South Pasadena, CA (US); Vazgen Karapetyan, Pasadena, CA (US); Andreas Kolling, Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 259 days.

(21) Appl. No.: 16/425,658

(22) Filed: May 29, 2019

(65) Prior Publication Data

US 2020/0375429 A1 Dec. 3, 2020

(51) Int. Cl.
*G05D 1/02* (2020.01)
*A47L 11/40* (2006.01)

(52) U.S. Cl.
CPC ........ *A47L 11/4061* (2013.01); *G05D 1/0219* (2013.01); *A47L 2201/04* (2013.01); *A47L 2201/06* (2013.01); *G05D 2201/0203* (2013.01); *G05D 2201/0215* (2013.01)

(58) Field of Classification Search
CPC .................................. G05D 1/02; A47L 11/40
See application file for complete search history.

(56) References Cited

U.S. PATENT DOCUMENTS

| | | | |
|---|---|---|---|
| 6,690,134 B1 | 2/2004 | Jones et al. | |
| 9,026,302 B2 | 5/2015 | Stout et al. | |
| 9,436,186 B2* | 9/2016 | Oh | G05D 1/0251 |
| 9,554,508 B2 | 1/2017 | Balutis et al. | |
| 9,868,211 B2 | 1/2018 | Williams et al. | |
| 10,365,659 B2* | 7/2019 | Park | A47L 9/2857 |
| 2012/0221187 A1* | 8/2012 | Jeon | A47L 9/009 |
| | | | 701/26 |
| 2013/0211589 A1 | 8/2013 | Landry et al. | |
| 2015/0158174 A1 | 6/2015 | Romanov et al. | |

(Continued)

OTHER PUBLICATIONS

[No Author Listed] "Neato All-Floor Robotic Vacuum User's Guide," Neato Robotics, 2011, 174 pages.

(Continued)

*Primary Examiner* — Kira Nguyen
(74) *Attorney, Agent, or Firm* — Fish & Richardson P.C.

(57) ABSTRACT

An autonomous mobile robot includes a drive system to support the robot above a surface, a sensor system configured to generate a signal indicative of a location of the robot on the surface, and a controller operably connected to the drive system and the sensor system. The drive system is operable to navigate the robot about the surface. The controller is configured to execute instructions to perform operations including establishing a behavior control zone on the surface, controlling the drive system, in response to establishing the behavior control zone on the surface, to maneuver the robot to a location of the behavior control zone on the surface, and maneuvering, using the drive system, the robot about the surface and initiating a behavior in response to determining, based on the signal indicative of the location of the robot, that the robot is proximate the behavior control zone.

30 Claims, 30 Drawing Sheets

(56) References Cited

U.S. PATENT DOCUMENTS

| | | |
|---|---|---|
| 2016/0297072 A1 | 10/2016 | Williams et al. |
| 2017/0147002 A1* | 5/2017 | Yu .......................... A47L 9/2894 |
| 2018/0050634 A1 | 2/2018 | White et al. |
| 2018/0074508 A1* | 3/2018 | Kleiner .................. A47L 9/2852 |
| 2018/0157266 A1* | 6/2018 | Xie ..................... A47L 11/4005 |
| 2018/0284792 A1 | 10/2018 | Kleiner et al. |
| 2018/0292832 A1 | 10/2018 | Bae et al. |
| 2019/0176321 A1* | 6/2019 | Afrouzi ................ G05D 1/0044 |
| 2020/0268226 A1* | 8/2020 | Lindhe ................. G05D 1/0016 |

OTHER PUBLICATIONS

Ecovacs.cn [online] "DN33 tips," retrieved on Jun. 17, 2019, retrieved from URL <https://www.ecovacs.cn/deebot/dn33/use-tips-4.html>.

International Search Report and Written Opinion in International Appln. No. PCT/US2020/26183, dated Jun. 29, 2020, 13 pages.

International Preliminary Report on Patentability in International Appln. No. PCT/US2020/026183, dated Dec. 9, 2021, 12 pages.

\* cited by examiner

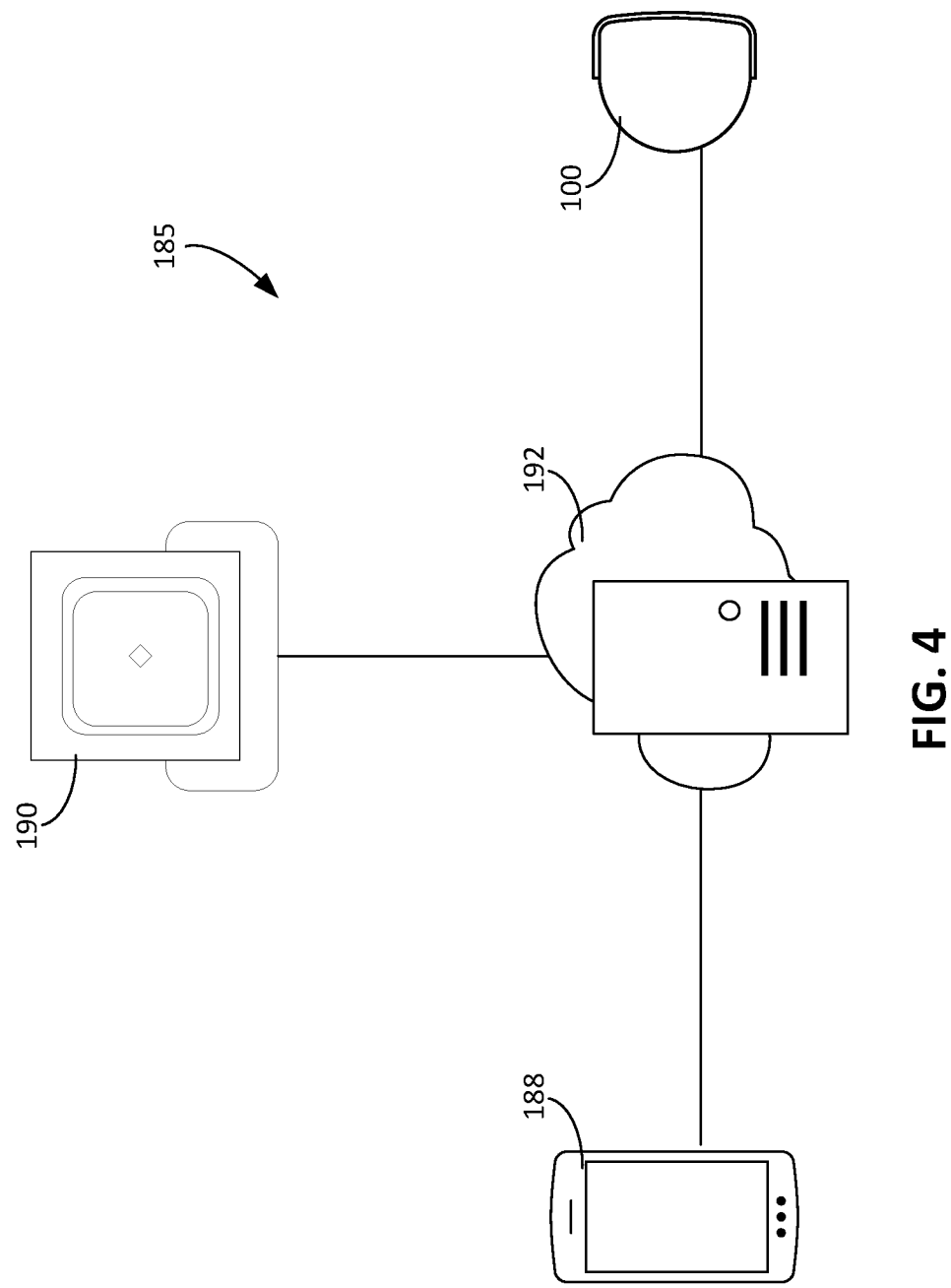

CONTROL OF AUTONOMOUS MOBILE ROBOTS

TECHNICAL FILED

This specification relates to control of autonomous mobile robots.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves.

SUMMARY

A human user can create cleaning zones for an autonomous mobile cleaning robot, such as by using a mobile device. The mobile device can present a map of the environment to the human user and the human user can indicate a cleaning zone, for example by interacting with a touchscreen of the mobile device. The cleaning zone can define an area where the robot performs additional or reduced cleaning. For example, a human user can create a keep out zone to prevent an autonomous mobile cleaning robot from cleaning certain areas within the environment. In another example, a human user can create a focused cleaning zone where the autonomous mobile cleaning robot can perform additional cleaning (e.g., clean for a longer duration, with a higher vacuum power, more passes with a cleaning pad, or more water) within the environment. After the cleaning zone is established, the robot can confirm the cleaning zone by, for example, moving to the cleaning zone.

Advantages of the foregoing and other implementations described herein may include, but are not limited to, those described below and herein elsewhere. The implementations described herein, for example, can improve ease of selection, accuracy, customizability, and adaptability of behavior control zones for controlling behaviors of autonomous mobile robots.

Implementations described herein can improve the ease of user selection of behavior control zones for autonomous mobile robots. For example, a mobile application can present a representation of an environment of an autonomous mobile robot (e.g., a 2D map), and a user can interact with the representation to define the behavior control zone. The representation can provide context for the user as the user defines a behavior control zone. In addition, indicators of features of the environment (e.g. an icon representing a table) can be overlaid on the representation of the environment to provide further context. In some implementations, the user can simply define a behavior control zone by selecting one of the indicators, with the defined behavior control zone corresponding to an object or feature in the environment corresponding to the selected indicator. Such a selection process can be intuitive to a user, and allow a user to easily discern where a selected behavior control zone is in the environment.

Implementations described herein can further improve the accuracy of placing behavior control zones. Contextual indicators presented on a mobile application can allow the user to select a behavior control zone that more accurately matches a user's intended placement of the behavior control zone. For example, rather than having to crudely interact with a mobile application to establish bounds of a behavior control zone, the user can select the behavior control zone by simply selecting an indicator of a feature of an environment of an autonomous mobile robot.

Confirmation of the behavior control zone can further ensure that the selected behavior control zone matches the user's intended behavior control zone. The robot can physically move to the behavior control zone so that the user can confirm that the location of the robot matches with the user's intended location of the behavior control zone. In some implementations, the user can further provide a confirmation that the location of the robot, after moving to the location of the behavior control zone, matches with the user's intended location of the behavior control zone. Such confirmation steps can improve the accuracy of placing a behavior control zones.

In implementations in which multiple autonomous mobile robots move about an environment, behavior control zones can be established in such a manner to differentially control each robot. For example, a behavior control zone could be used to cause one robot, but not another robot, to avoid the behavior control zone. Such differential control of robots can improve the user's ability to manage a fleet of robots in which each robot performs a different function. For example, one robot can be a vacuum cleaning robot, while another robot can be a mopping robot. In such implementations, the user can benefit from being able to establish a behavior control zone that, for example, allows the vacuum cleaning robot to enter a particular floor area, e.g., a carpet, but does not allow the mopping robot to enter the particular floor area.

Implementations described herein can further improve efficiency of selecting behavior control zones and updating behavior control zones. In some implementations, a user defines a behavior control zone associated with a feature of an environment. A location of the feature of the environment may move in some cases. Rather than a user having to manually update the behavior control zone, the behavior control zone can be automatically updated in response to detection of movement of the feature of the environment, e.g., detection by the robot as the robot moves about the floor surface. Such automatic updating of the behavior control zone reduces the need for user input for updating behavior control zones.

Implementations described herein can further improve customizability of operations of autonomous mobile robots within different environments. The user can select behavior control zones such that an autonomous mobile robot performs a certain behavior in an area of an environment particularly requiring the robot's attention. In examples in which the robot is a cleaning robot, the behavior control zone can be selected to cause the robot to perform a focused cleaning operation in an area of the environment that frequently gets dirtier relative to other areas of the environment.

In one aspect, an autonomous mobile robot includes a drive system to support the robot above a surface, a sensor system configured to generate a signal indicative of a location of the robot on the surface, and a controller operably connected to the drive system and the sensor system. The drive system is operable to navigate the robot about the surface. The controller is configured to execute instructions to perform operations including establishing a behavior control zone on the surface, controlling the drive system, in response to establishing the behavior control zone on the surface, to maneuver the robot to a location of the behavior control zone on the surface, and maneuvering, using the drive system, the robot about the surface and initiating a behavior in response to determining, based on the signal indicative of the location of the robot, that the robot is proximate the behavior control zone.

In some implementations, the robot can further include a light indicator system. The controller can be operably connected to the light indicator system, and the operations can include activating the light indicator system in response to the robot being proximate the behavior control zone.

In some implementations, activating the light indicator system in response to the robot being proximate the behavior control zone can include operating the light indicator system to indicate a direction of the behavior control zone relative to the location of the robot.

In some implementations, the operations can include activating the light indicator system in response to establishing the behavior control zone.

In some implementations, the operations can include, in response to establishing the behavior control zone, controlling the drive system to navigate the robot through at least a portion of the behavior control zone. In some implementations, controlling the drive system to navigate the robot through at least the portion of the behavior control zone can include controlling, in response to wirelessly receiving user instructions, the drive system to navigate the robot through at least the portion of the behavior control zone. In some implementations, the portion of the behavior control zone can include a perimeter of the behavior control zone. In some implementations, the portion of the behavior control zone can include a path through an interior of the behavior control zone.

In some implementations, the operations can further include transmitting mapping data to cause a mobile device to present a map of the surface, and receiving from the mobile device a user instruction to establish the behavior control zone.

In some implementations, the operations can further include, in response to establishing the behavior control zone, controlling the drive system to navigate the robot along a perimeter of the behavior control zone.

In some implementations, the surface can include a first portion having a first surface type and a second portion having a second surface type. The behavior control zone can cover the second portion having the second surface type. Initiating the behavior in response to determining, based on the signal indicative of the location of the robot, that the robot is proximate the behavior control zone can include initiating the behavior in response to determining that the robot is proximate the second portion of the surface as the robot maneuvers about the first portion of the surface.

In some implementations, the robot can include a vacuum system to clean the surface, and the behavior includes adjusting a vacuum power delivered to the vacuum system.

In some implementations, the behavior can include adjusting a movement speed of the robot.

In some implementations, the behavior can include adjusting a movement direction of the robot.

In some implementations, adjusting the movement direction of the robot can include orienting the robot to enter the behavior control zone at an angle.

In some implementations, the behavior control zone can be a keep-out zone. The behavior can include avoiding the keep-out zone.

In some implementations, the operations can include controlling the drive system to maneuver the robot along a path in a first direction into the behavior control zone, and in response to detecting that the robot is within the behavior control zone, controlling the drive system to maneuver the robot along the path in a second direction out of the behavior control zone.

In some implementations, the operations can include detecting that the robot is within the behavior control zone, and preventing initiation of an operation of the robot in response to detecting that the robot is within the behavior control zone. In some implementations, preventing the initiation of the operation of the robot in response to detecting that the robot is within the behavior control zone can include preventing initiation of a movement operation of the robot in response to detecting that the robot is within the behavior control zone.

In some implementations, initiating the behavior in response to determining, based on the signal indicative of the location of the robot, that the robot is proximate the behavior control zone can include initiating the behavior in response to determining, based on the signal indicative of the location of the robot, that the robot is within a buffer zone around the behavior control zone. In some implementations, the sensor system cam ne configured to generate data indicative of locations of the robot on the surface. The operations can include estimating an uncertainty associated with the data indicative of the locations of the robot. A size of the buffer zone can be based on the estimated uncertainty. In some implementations, the size of the buffer zone can be proportional to the estimated uncertainty. In some implementations, a size of the buffer zone can be user-selected. The size can be provided by a mobile device.

In some implementations, the behavior control zone can cover a first portion of the surface containing an object. The operations can include updating the behavior control zone to cover a second portion of the surface in response to the object being moved to the second portion of the surface.

In another aspect, a method includes presenting, on a display, a map including a representation of a perimeter of a surface in an environment, presenting, on the display and overlaid on the map, indicators indicative of features of the environment, receiving a user instruction to establish a behavior control zone on a surface; and transmitting, to an autonomous mobile robot, data indicative of the behavior control zone to cause the robot to move to a location of the behavior control zone on the surface and cause the robot to initiate a behavior in response to the robot being proximate to the behavior control zone as the robot maneuvers about the surface.

In some implementations, the behavior control zone can be associated with at least one of the indicators. In some implementations, the features of the environment can include an object on the surface. The at least one of the indicators can be indicative of the object on the surface. In some implementations, the features of the environment can include a surface type of a portion of the surface. The at least one of the indicators can be indicative of the surface type. In some implementations, the method can further include presenting, in an augmented reality mode, an image of the environment and an indicator indicative of the behavior control zone overlaid on the image of the environment. In some implementations, receiving the user instruction to establish the behavior control zone associated with the at least one of the indicators can include receiving a user selection of a portion of the map proximate to the at least one of the indicators.

In some implementations, the robot can be a first autonomous mobile robot. Receiving the user instruction to establish the behavior control zone can include establishing the behavior control zone such that the first robot, in the initiated behavior, avoids the behavior control zone and a second autonomous mobile robot autonomously maneuvers through the behavior control zone.

In some implementations, the method can further include presenting a request for confirmation to establish the behavior control zone. Presenting the request for confirmation to establish the behavior control zone can include presenting the request in response to the robot moving about a portion of a perimeter of the behavior control zone.

In some implementations, the behavior can be a cleaning behavior in which the robot moves about the surface to clean the surface.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 4 is a diagram of a communication network.

Like reference numbers and designations in the various drawings indicate like elements.

DETAILED DESCRIPTION

Autonomous mobile robots can be controlled to move about a floor surface in an environment. In some implementations, these robots can initiate behaviors dependent on their locations on the floor surface. For example, a robot can be controlled to initiate a certain behavior in response to being proximate to an area on the floor surface. A user can define the area by using an application, e.g., being executed on a computing device. Once the user defines the area, the robot can move to or toward the area to confirm the selection.

Figure 1:
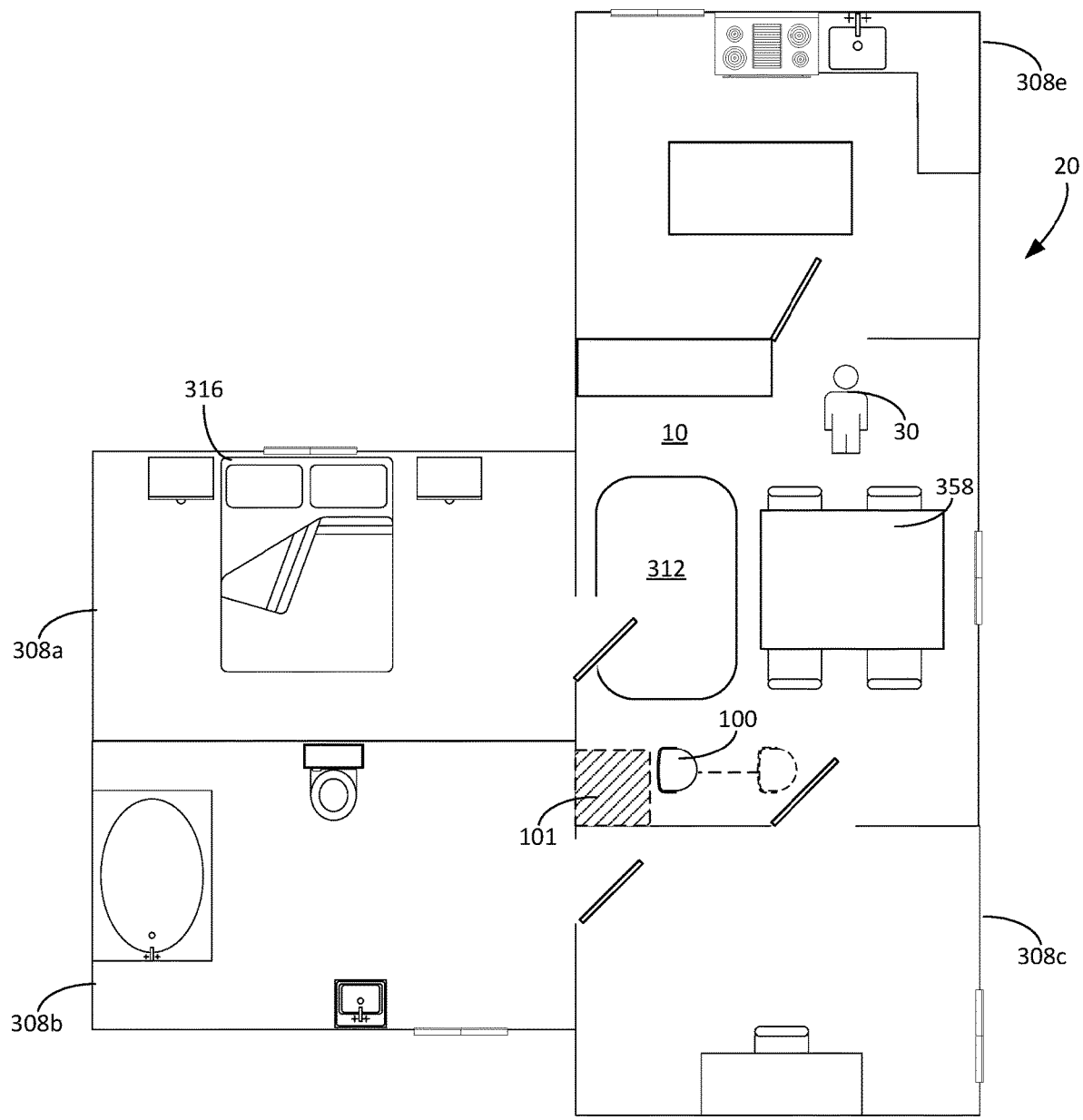
FIG. 1 is a schematic top view of an environment.

FIG. 1 depicts an example of a robot 100 on a floor surface 10 in an environment 20, e.g., a home. A user 30 can define a behavior control zone 101 using, for example, the methods and systems described herein. In response to the user 30 defining the behavior control zone 101, the robot 100 moves toward the behavior control zone 101 to confirm the selection, e.g., moves to a location proximate the behavior control zone 101. This movement behavior can allow the user 30 to confirm that the actual location of the behavior control zone 101 matches with the user's intended location for the behavior control zone 101.

After confirmation, an autonomous operation of the robot 100 can be initiated. In this autonomous operation, the robot 100 can initiate a behavior in response to being proximate to the behavior control zone 101. For example, in some examples in which the robot 100 is an autonomous cleaning robot, the user 30 defines an area of the environment 20 that is prone to becoming dirty to be the behavior control zone 101. In response to being proximate to the behavior control zone 101, the robot 100 can initiate a focused cleaning behavior in which the robot 100 performs a focused clean of a portion of a floor surface 10 in the behavior control zone 101. As described herein, behavior control zones, such as the behavior control zone 101, can allow the robot 100 to efficiently and adaptively clean the floor surface 10 in the environment 20

Example Autonomous Mobile Robots

Figure 2:
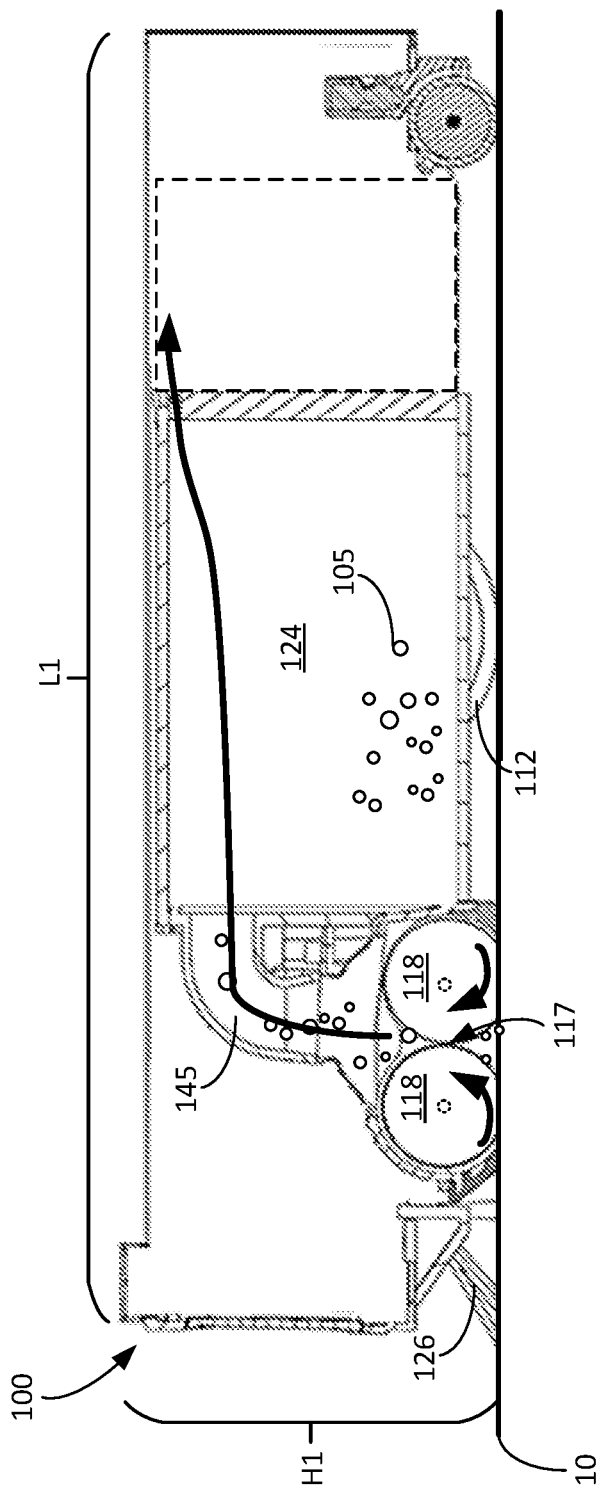
FIGS. 2, 3A, and 3B are side cross-sectional, bottom, and top perspective views of an autonomous mobile robot.
Figure 3A:
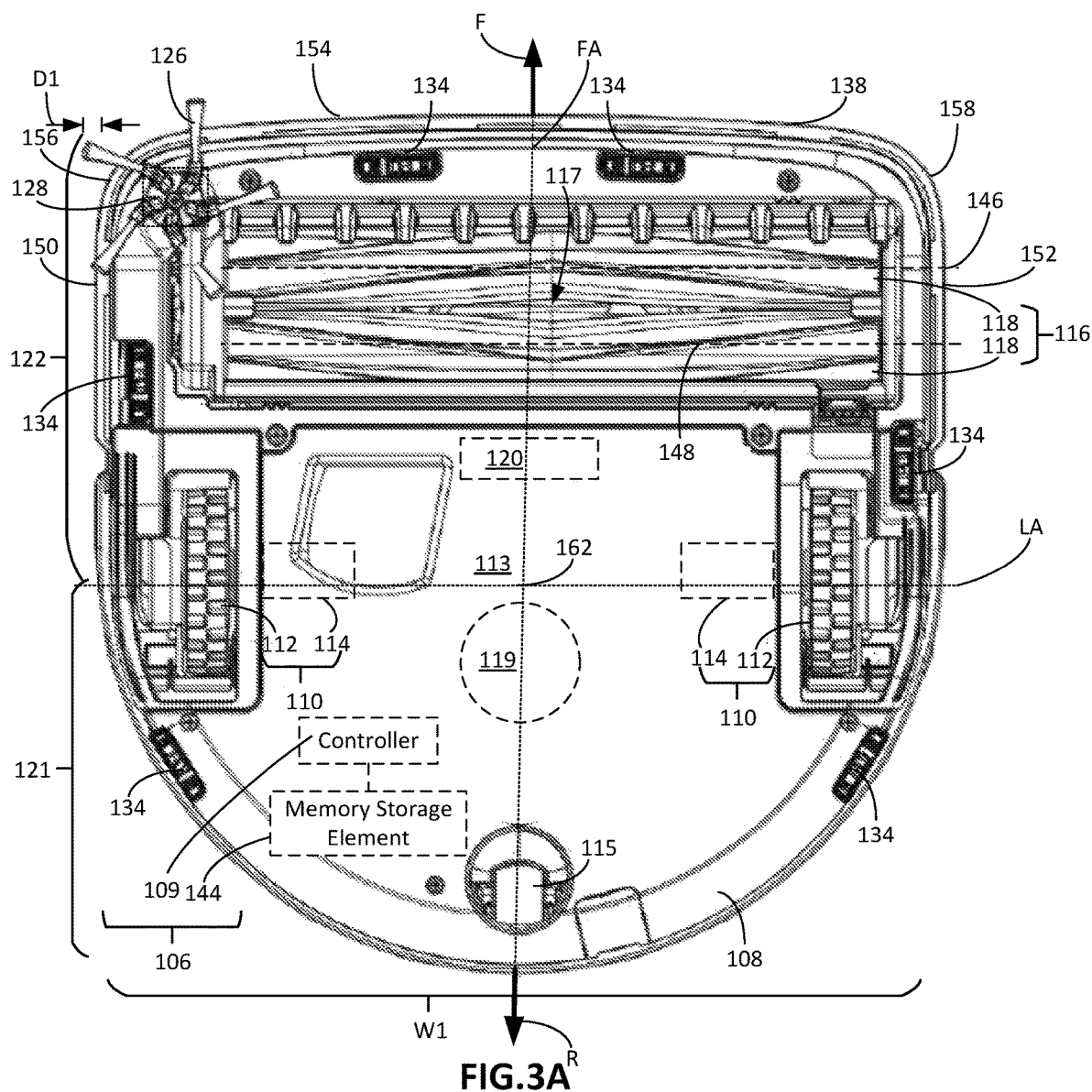
Figure 3B:
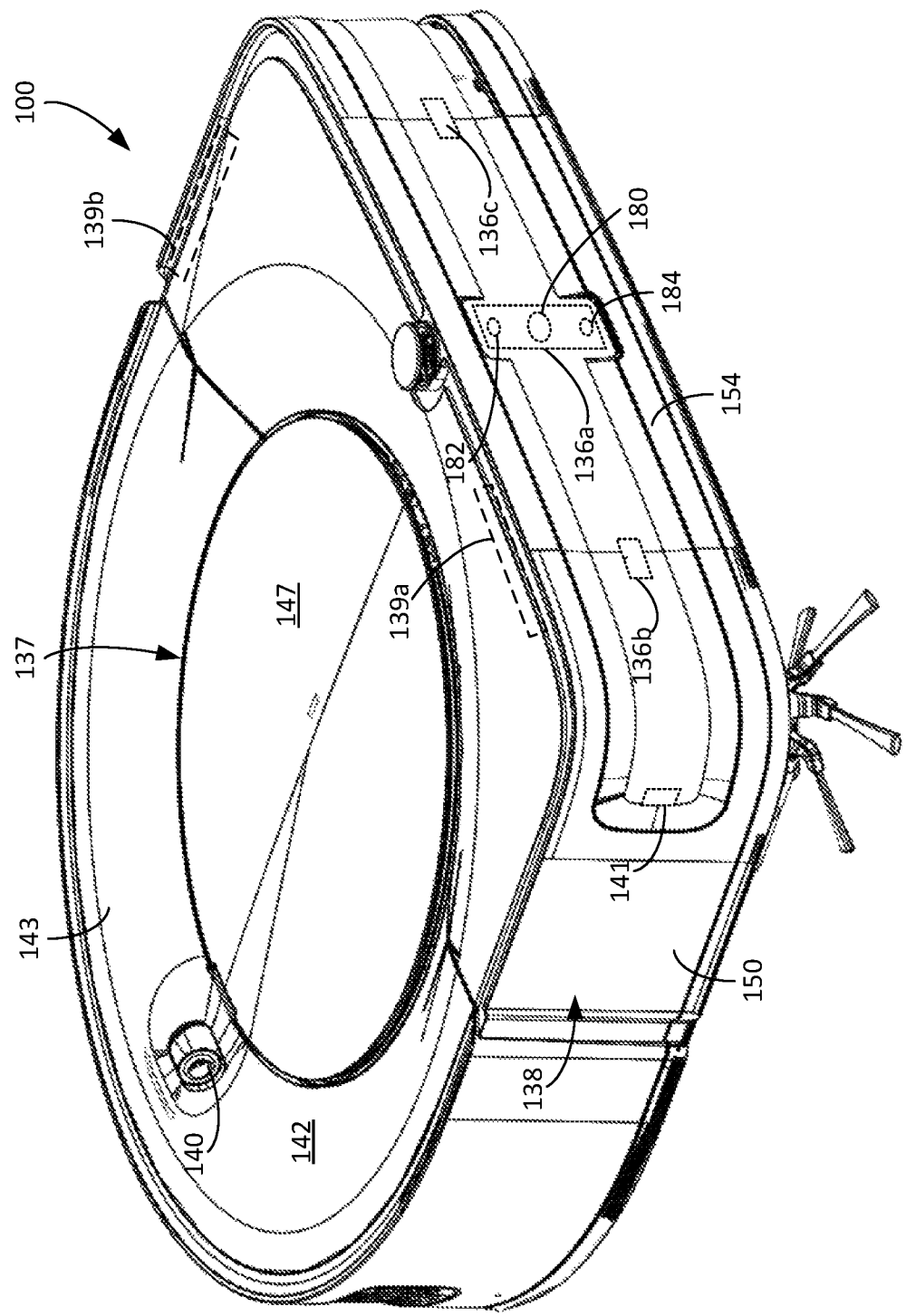

FIGS. 2 and 3A-3B depict an example of the robot 100. Referring to FIG. 2, the robot 100 collects debris 105 from the floor surface 10 as the robot 100 traverses the floor surface 10. Referring to FIG. 3A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 2) of the robot 100 relative to the floor surface is, for example, no more than 13 centimeters. The robot 100 is also compact. An overall length L1 (shown in FIG. 2) of the robot 100 and an overall width W1 (shown in FIG. 3A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 3A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 3B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154.

In the example depicted in FIGS. 2, 3A, and 3B, the robot 100 is an autonomous mobile floor cleaning robot that includes a cleaning assembly 116 (shown in FIG. 3A) operable to clean the floor surface 10. For example, the robot 100 is a vacuum cleaning robot in which the cleaning assembly 116 is operable to clean the floor surface 10 by ingesting debris 105 (shown in FIG. 2) from the floor surface 10. The cleaning assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning assembly 116 includes one or more rotatable members, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 2, the cleaning inlet 117 is positioned between the rotatable members 118.

As shown in FIG. 2, the rotatable members 118 are rollers that counter rotate relative to one another. For example, the rotatable members 118 can be rotatable about parallel horizontal axes 146, 148 (shown in FIG. 3A) to agitate debris 105 on the floor surface 10 and direct the debris 105 toward the cleaning inlet 117, into the cleaning inlet 117, and into a suction pathway 145 (shown in FIG. 2) in the robot 100. Referring back to FIG. 3A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 2), as the rotatable members 118 rotate relative to the housing infrastructure 108. The rotatable members 118 further contact the floor surface 10 to agitate debris 105 on the floor surface 10.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 3A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 109 is configured to execute instructions to perform one or more operations as described herein. The memory storage element 144 is accessible by the controller 109 and disposed within the housing infrastructure 108. The one or more electrical sensors are configured to detect features in an environment of the robot 100. For example, referring to FIG. 3A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 3B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 3A) of the robot 100, and the bump sensor 139b can be used to detect movement of the bumper 138 along the lateral axis LA (shown in FIG. 3A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each includes an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance travelled by the robot 100. For example, the sensor system can include encoders associated with the motors 114 for the drive wheels 112, and these encoders can track a distance that the robot 100 has travelled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance travelled by the robot 100 based on changes in floor features as the robot 100 travels along the floor surface 10.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles within the environment of the robot 100 during the mission.

The sensor data can be used by the controller 109 for simultaneous localization and mapping (SLAM) techniques in which the controller 109 extracts features of the environment represented by the sensor data and constructs a map of the floor surface 10 of the environment. The sensor data collected by the image capture device 140 can be used for techniques such as vision-based SLAM (VSLAM) in which the controller 109 extracts visual features corresponding to objects in the environment and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enables the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment using the persistent map to optimize paths taken during the missions.

The robot 100 can, in some implementations, include a light indicator system 137 located on the top portion 142 of the robot 100. The light indicator system 137 can include light sources positioned within a lid 147 covering the debris bin 124 (shown in FIG. 3A). The light sources can be positioned to direct light to a periphery of the lid 147. The light sources are positioned such that any portion of a continuous loop 143 on the top portion 142 of the robot 100 can be illuminated. The continuous loop 143 is located on a recessed portion of the top portion 142 of the robot 100 such that the light sources can illuminate a surface of the robot 100 as they are activated.

Example Communication Networks

Referring to FIG. 4, an example communication network 185 is shown. Nodes of the communication network 185 include the robot 100, a mobile device 188, an autonomous mobile robot 190, and a cloud computing system 192. Using the communication network 185, the robot 100, the mobile device 188, the robot 190, and the cloud computing system 192 can communicate with one another to transmit data to one another and receive data from one another. In some implementations, the robot 100, the robot 190, or both the robot 100 and the robot 190 communicate with the mobile device 188 through the cloud computing system 192. Alternatively or additionally, the robot 100, the robot 190, or both the robot 100 and the robot 190 communicate directly with the mobile device 188. Various types and combinations of wireless networks (e.g., Bluetooth, radio frequency, optical based, etc.) and network architectures (e.g., mesh networks) may be employed by the communication network 185.

In some implementations, the mobile device 188 as shown in FIG. 4 is a remote device that can be linked to the cloud computing system 192 and can enable the user 30 to provide inputs on the mobile device 188. The mobile device 188 can include user input elements such as, for example, one or more of a touchscreen display, buttons, a microphone, a mouse, a keyboard, or other devices that respond to inputs provided by the user 30. The mobile device 188 alternatively or additionally includes immersive media (e.g., virtual reality) with which the user 30 interacts to provide a user input. The mobile device 188, in these cases, is, for example, a virtual reality headset or a head-mounted display. The user can provide inputs corresponding to commands for the mobile robot 188. In such cases, the mobile device 188 transmits a signal to the cloud computing system 192 to cause the cloud computing system 192 to transmit a command signal to the mobile robot 100. In some implementations, the mobile device 188 can present augmented reality images. In some implementations, the mobile device 188 is a smartphone, a laptop computer, a tablet computing device, or other mobile device.

In some implementations, the communication network 185 can include additional nodes. For example, nodes of the communication network 185 can include additional robots. Alternatively or additionally, nodes of the communication network 185 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 185 depicted in FIG. 4 and in other implementations of the communication network 185, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Example Processes

The robot 100 can be controlled in certain manners in accordance with processes described herein. While some operations of these processes may be described as being performed by the robot 100, by a user, by a computing device, or by another actor, these operations may, in some implementations, be performed by actors other than those described. For example, an operation performed by the robot 100 can be, in some implementations, performed by the cloud computing system 192 or by another computing device (or devices). In other examples, an operation performed by the user 30 can be performed by a computing device. In some implementations, the cloud computing system 192 does not perform any operations. Rather, other computing devices perform the operations described as being performed by the cloud computing system 192, and these computing devices can be in direct (or indirect) communication with one another and the robot 100. And in some implementations, the robot 100 can perform, in addition to the operations described as being performed by the robot 100, the operations described as being performed by the cloud computing system 192 or the mobile device 188. Other variations are possible. Furthermore, while the methods, processes, and operations described herein are described as including certain operations or sub-operations, in other implementations, one or more of these operation or sub-operations may be omitted, or additional operations or sub-operations may be added.

Figure 5A:
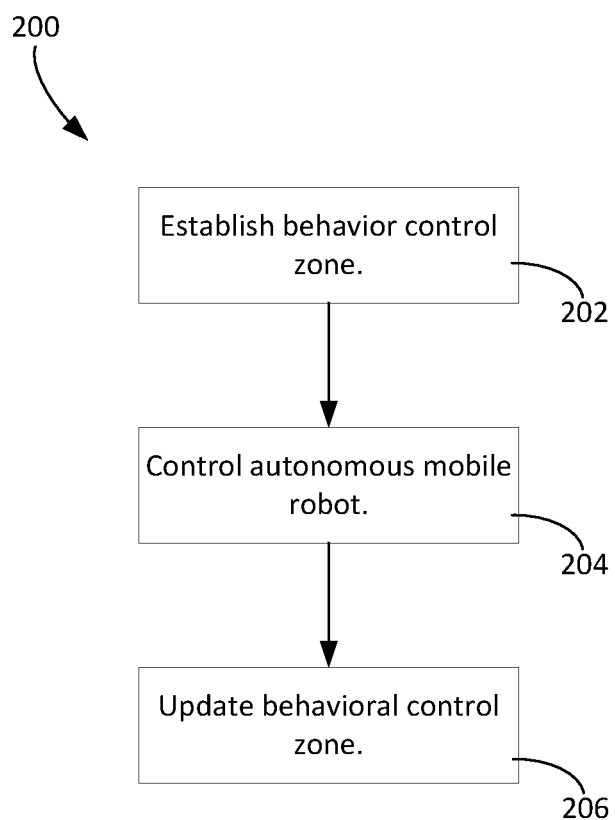
FIG. 5A is a flowchart of a process of controlling an autonomous mobile robot in accordance with a behavior control zone.

FIG. 5A illustrates a flowchart of a method to control an autonomous mobile robot in accordance with a behavior control zone. This method, and other examples of methods described herein, is described with respect to control of the robot 100. In other implementations, other types of autonomous mobile robots may be controlled.

Referring to FIG. 5A, a process 200 includes operations 202, 204, and 206. At the operation 202, a behavior control zone is established. At the operation 204, the robot 100 is controlled, e.g., to perform an autonomous operation in which the robot 100 navigates about the environment 20 and is responsive to the behavior control zone. For example, the drive system 110 (shown in FIG. 3A) of the robot 100 can be controlled to maneuver the robot 100 about the floor surface 10 (shown in FIG. 1), and a behavior of the robot 100 can be initiated in response to determining, based on a signal indicative of a location of the robot 100 generated by the sensor system of the robot, that the robot is proximate the behavior control zone. At the operation 204, the behavior control zone is updated, e.g., in response to a change in the environment 20. Further examples of suboperations of the operations 202, 204, and 206 are described in connection with FIGS. 5B, 5C, and 5D, respectively.

Figure 5B:
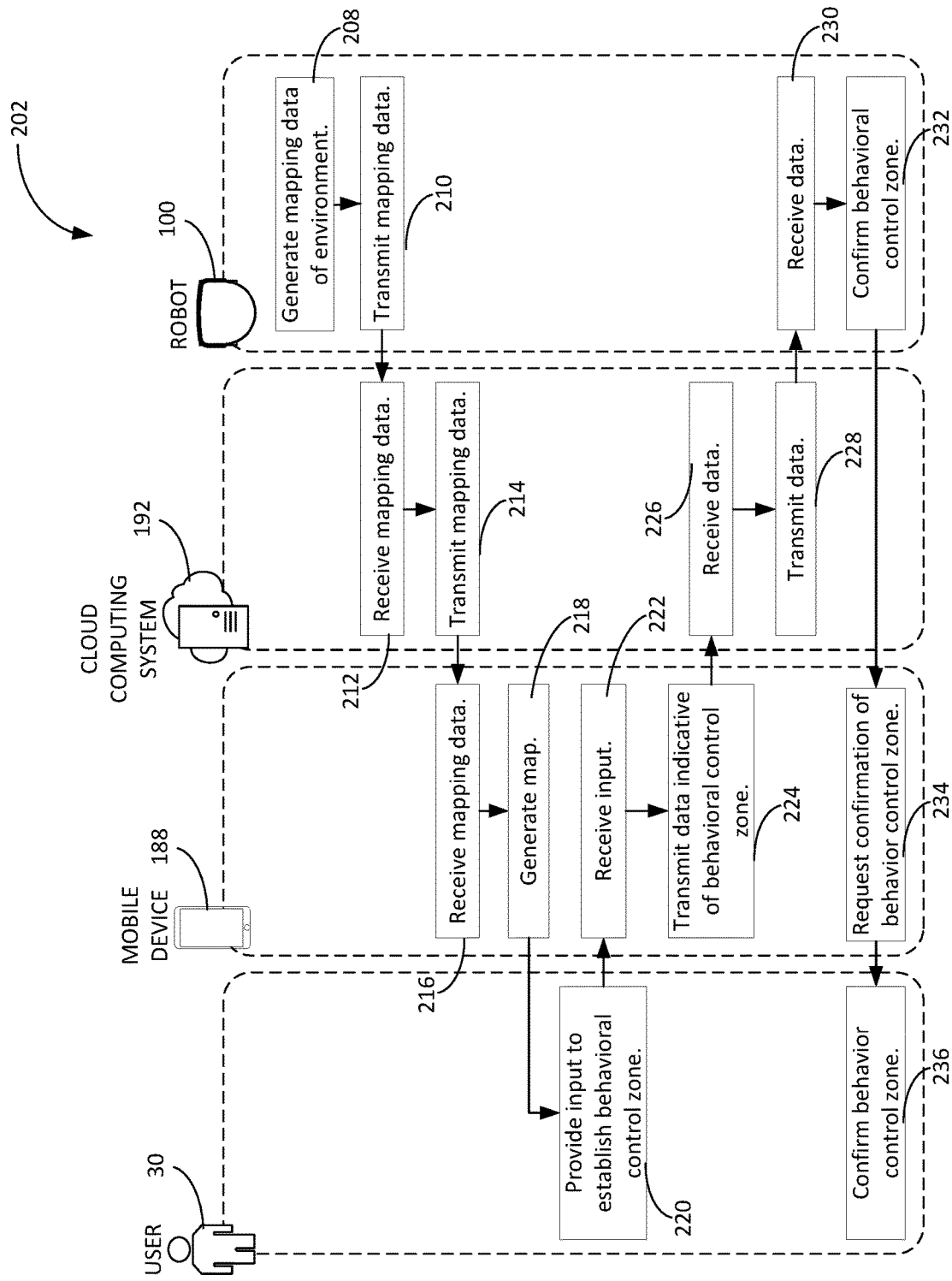
FIG. 5B is a flowchart of a process of establishing a behavior control zone.

FIG. 5B illustrates an example process for the operation 202 in which the behavior control zone is established. At operations 208, 210, 212, 214, 216, mapping data is generated and transmitted to the mobile device 188 to allow the mobile device 188 to generate a representation of the environment 20. At the operation 208, the robot 100 generates mapping data of the environment 20, and at an operation 210 the robot 100 transmits the mapping data to the cloud computing system 192. At the operation 212, the cloud computing system 192 receives the mapping data generated by the robot 100. At the operation 214, the cloud computing system 192 transmits the mapping data generated by the robot 100 to the mobile device 188. And at the operation 216, the mobile device 188 receives the mapping data generated by the robot 100. This mapping data, as described with respect to an operation 218, can be used by the mobile device 188 to generate a representation of the environment 20.

In some implementations, at the operation 208, the robot 100 can generate the mapping data during an autonomous cleaning operation. The mapping data can indicate portions of the floor surface 10 that the robot 100 can traverse and portions of the floor surface 10 that the robot 100 cannot traverse. The mapping data can be generated using the sensor system of the robot 100. The sensor system can generate data indicative of locations of the robot 100 on the floor surface 10 as the robot 100 moves about the floor surface 10, and the mapping data can be generated based on the data indicative of the location of the robot 100. In some implementations, the sensor system of the robot 100 can be used to detect an obstacle on the floor surface 10 as the robot 100 moves about the surface. The mapping data generated by the robot can indicate a location of the obstacle on the surface. In some implementations, sensor data generated by the robot 100 and data produced by one or more network-connected devices in the environment 20 together form the mapping data. The network-connected devices can include cameras, optical sensors, ranging sensors, acoustic sensors, or other sensors that generate signals to be used to form a part of a map of the environment 20.

In some implementations, the cloud computing system 192 can process the mapping data generated by the robot 100 such that the data transmitted by the cloud computing system 192 at the operation 214 and received by the mobile device 188 at the operation 216 differ from the mapping data generated by the robot 100 at the operation 208. For example, the cloud computing system 192 can generate user interface data from the mapping data, and can then transmit the user interface data at the operation 214. The user interface data can be generated using the mapping data generated by the robot 100 as well as data received from other network-connected devices. The user interface data can include categorizations of certain features identified in the environment 20, e.g., furniture, floor surface types, or other features.

At the operation 218, the mobile device 188 generates a map of the environment 20. For example, the mobile device 188 generates the map based on the data received by the mobile device 188 at the operation 216 and presents the map on a display of the mobile device 188. In some implementations, the data received at the mobile device 188 at the operation 216 can include data about features in the environment 20, such as a floor surface type, obstacles, wall fixtures, appliances, and other features of the environment 20 detectable by the robot 100 and its sensor system.

Figure 6A:
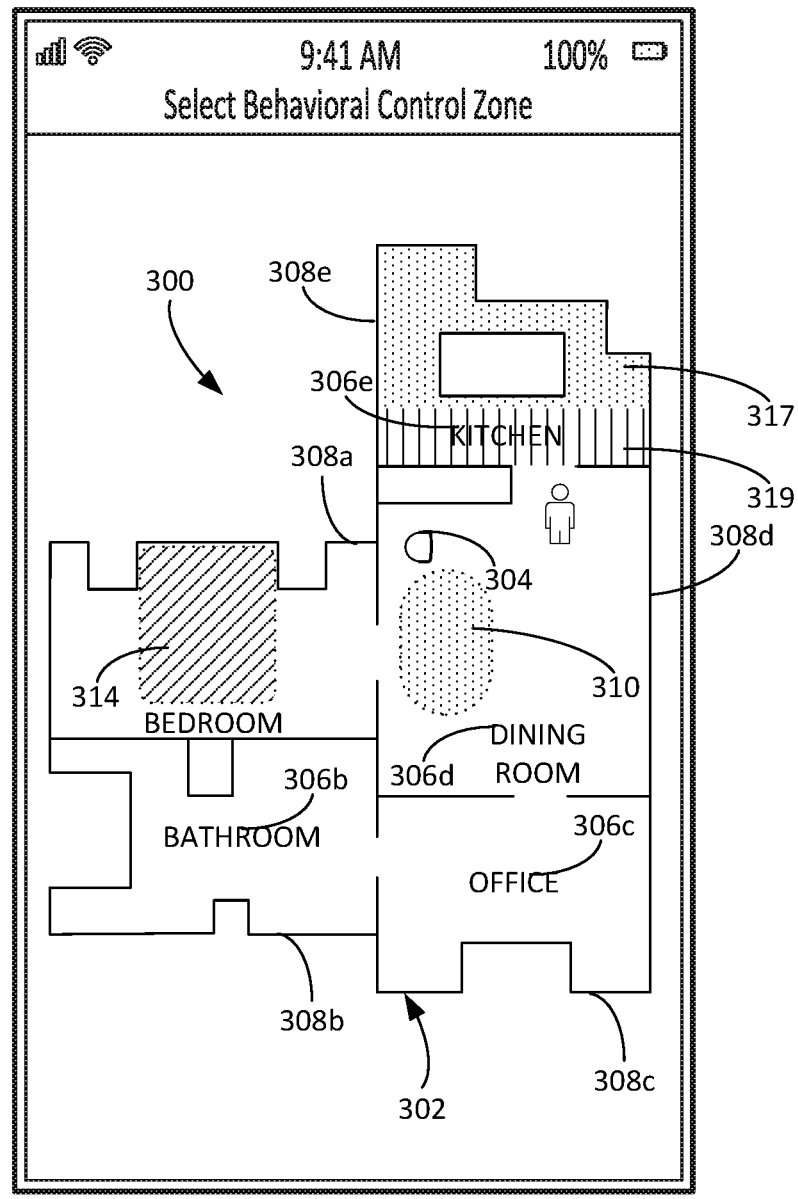
FIGS. 6A-6D are illustrations of user interfaces for a mobile device.

FIG. 6A illustrates an example of a map 300 presented on the mobile device 188. The map 300 includes a representation of a perimeter 302 of a portion of the floor surface 10 (shown in FIG. 1) across which the robot 100 can traverse. An indicator 304 indicating a current location of the robot 100 is overlaid on the map 300.

Labels 306a, 306b, 306c, 306d, 306e (collectively referred to as labels 306) for rooms 308a, 308b, 308c, 308d, 308e (collectively referred to as rooms 308), respectively, are overlaid on the map 300. For example, a type of each room 308 can be identified based on one or more objects in each of the rooms 308. Referring also to FIG. 1, the rooms 308 includes a bedroom 308a, a bathroom 308b, an office 308c, a dining room 308d, and a kitchen 308e. The bedroom 308a can be identified based on the presence of objects typically found in bedrooms, such as a bed and end tables. The bathroom 308b can be identified based on the presence of objects typically found in bathrooms, such as a bathtub, a toilet, a sink, and a mirror. The office 308c can be identified based on the presence of objects typically found in offices, such as a desk and a computer. The dining room 308d can be identified based on the presence of objects typically found in dining rooms, such as a dining table and chairs. The kitchen 308e can be identified based on the presence of objects typically found in kitchens, such as a cabinets, a kitchen island, and a counter. In some implementations, the objects in the rooms 308 can be identified using the sensor system of the robot 100, or using sensors from other network-connected devices in the environment 20.

In some implementations, the mobile device 188 can present a request to the user 30 to provide a label to each of the rooms 308. The rooms 308 can thus be manually provided with the labels 306 by the user 30. In some implementations, the labels 306 are determined based on computer identification of objects in the rooms 308.

As shown in FIG. 6A, the mobile device 188 can present indicators indicative of features of the environment 20. For example, an indicator 310 can indicate a location of an area rug 312 (shown in FIG. 1) located in the dining room 308d. An indicator 314 can indicate a location of a bed 316 (shown in FIG. 1) located in the bedroom 308a. An indicator 317 can indicate a first floor type in the kitchen 308e, and an indicator 319 can indicate a second floor type in the kitchen 308e. For example, the portion of the floor surface 10 corresponding to the indicator 317 in the kitchen 308e can be a hardwood surface, while the portion of the floor surface 10 corresponding to the indicator 319 in the kitchen 308e can be a carpet surface. In some implementations, other indicators indicative of other objects and features in the environment 20 can be shown overlaid on the map 300. For example, the indicators can be indicative of other furniture in the environment 20, of detectable features on walls of the environment 20, of other floor types in environment 20, or of other features in the environment 20.

Referring back to FIG. 5B, at an operation 220, the user 30 provides an input to establish a behavior control zone. The user 30 can operate the mobile device 188 to provide the input, e.g., operate a user input device of the mobile device 188, such as a touchscreen, one or more buttons on the mobile device 188, a voice command, a gesture, or other user input device. Referring also to FIG. 6A, the mobile device 188 can present the map 300 and request that the user 30 define a behavior control zone using the map 300. In some implementations, to define the behavior control zone, the user 30 can select one of the indicators presented on the mobile device 188 to define an area associated with the indicator to be a behavior control zone. The user 30 can select a portion of the map 300 proximate to an indicator to define a behavior control zone associated with the indicator. For example, referring also to FIG. 7A, a behavior control zone 318 corresponding to a location of the bed 316 in the bedroom 308a can be defined by selecting the indicator 314 presented on the mobile device 188. Alternatively or additionally, the user 30 can manually select an area on the map 300 to define a behavior control zone. For example, if the mobile device 188 includes a touchscreen, the user 30 can interact with the touchscreen to define a behavior control zone by drawing shapes on the touchscreen.

At operations 222, 224, 226, 228, and 230 the input provided by the user 30 is used to generate instructions to provide to the robot 100. In particular, at the operation 222, the mobile device 188 receives the input provided by the user 30 at the operation 220. The mobile device 188 can generate data indicative of the behavior control zone 318. For example, the data can be indicative of a location or a perimeter of the behavior control zone 318. At the operation 224, the mobile device 188 transmits data indicative of the behavior control zone 318 to the cloud computing system 192. At the operation 226, the cloud computing system 192 receives the data indicative of the behavior control zone 318. At the operation 228, the cloud computing system 192 transmits the data indicative of the behavior control zone to the robot 100. At the operation 230, the robot 100 receives the data indicative of the behavior control zone 318.

At operations 232, 234, 236, the behavior control zone 318 is confirmed. After receiving the data indicative of the behavior control zone 318, at the operation 232, the robot 100 confirms the behavior control zone 318. The robot 100 can provide feedback indicating that the robot 100 received the data indicative of the behavior control zone 318.

The robot 100 can also confirm a location or a perimeter of the behavior control zone 318. In some implementations, the robot 100 confirms the location or the perimeter of the behavior control zone 318 by performing a confirmation movement. In the example shown in FIG. 7A, the robot 100 moves relative to the behavior control zone 318 in a manner indicating the location of the behavior control zone 318. In response to receiving the data indicative of the behavior control zone 318, the robot 100 moves from its location 320 to a location 322. The location 322 can be proximate to the behavior control zone 318, in the behavior control zone 318, or along a perimeter of the behavior control zone 318. In some implementations, the robot 100 follows a path along the floor surface 10 to confirm the location or the perimeter of the behavior control zone 318. For example, the robot 100 can follow a path along a portion of the perimeter of the behavior control zone 318. In some implementations, the path can extend through a portion of the behavior control zone 318. The portion of the behavior control zone 318 can be an interior of the behavior control zone 318, or a portion of the perimeter of the behavior control zone 318.

In some implementations, the robot 100 can provide a visual or audible indication of receipt of the data indicative of the behavior control zone 318. In some implementations, after completing the confirmation movement, the robot 100 can provide a visual or audible indication that the confirmation movement is complete. The visual or audible indication can indicate that a request for a user confirmation is pending. For example, in some implementations, the light indicator system 137 (shown in FIG. 3B) can be activated in response to the behavior control zone 318 being established or to indicate that the robot 100 has confirmed the behavior control zone 318.

Figure 6B:
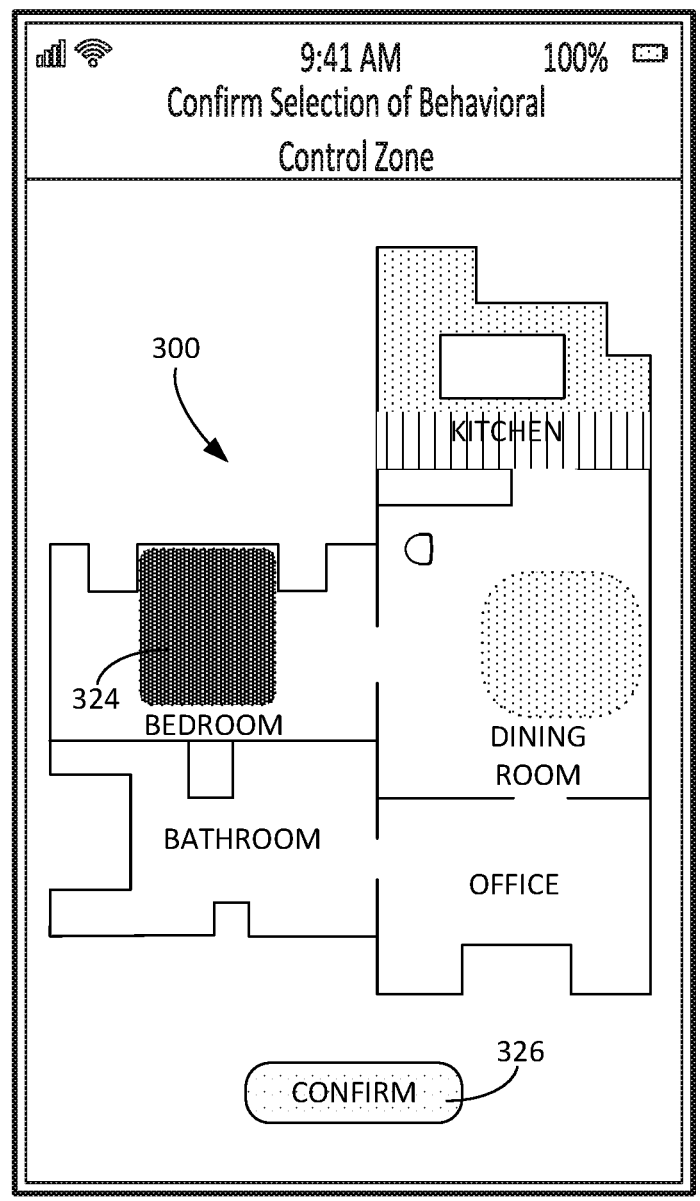

After the robot 100 confirms the behavior control zone 318, the mobile device 188 at the operation 234 requests confirmation from the user 30 of the behavior control zone 318 to establish the behavior control zone 318. The robot 100, for example, can transmit to the mobile device 188 data indicating that the robot 100 has completed its confirmation movement. Referring to FIG. 6B, the mobile device 188 can present a request for confirmation by the user 30, in which the mobile device 188 presents the map 300 and presents an indicator 324 that highlights an area of the floor surface 10 where the behavior control zone 318 (shown in FIG. 7A) is to be established. The indicator 324, for example, can be identical to the indicator 314 (shown in FIG. 6A) corresponding to the bed 316 (shown in FIG. 7A) except that the indicator 324 has a different color, pattern, or other visual characteristic distinct from visual characteristics of the indicator 314.

At the operation 236, the user 30 can confirm the behavior control zone. For example, as shown in FIG. 6B, the mobile device 188 can present a "confirm" button 326. The user 30 can view the robot 100 in the environment 20 to visually confirm the position of the robot 100 and hence a location of the behavior control zone 318. The user 30 can select the "confirm" button 326 to provide the confirmation of the behavior control zone 318. After the user 30 confirms the behavior control zone 318, data indicative of the behavior control zone 318 can be stored on one or more of the mobile device 188, the cloud computing system 192, or the robot 100.

Referring back to FIG. 5A, after the behavior control zone 318 is established at the operation 202 (e.g., after completion of the operations described in connection with FIG. 5B), the robot 100 can be controlled to initiate a behavior in response to determining that the robot 100 is proximate to or within the behavior control zone 318. For example, the robot 100 can initiate an autonomous cleaning operation in which the robot 100 moves about the environment 20 to clean the floor surface 10. During the autonomous cleaning operation, the robot 100 can initiate a behavior in response to determining that the robot 100 is proximate to or within the behavior control zone 318. The robot 100 can determine that the robot is proximate or within the behavior control zone 318 based on signals generated by the sensor system of the robot 100.

Figure 5C:
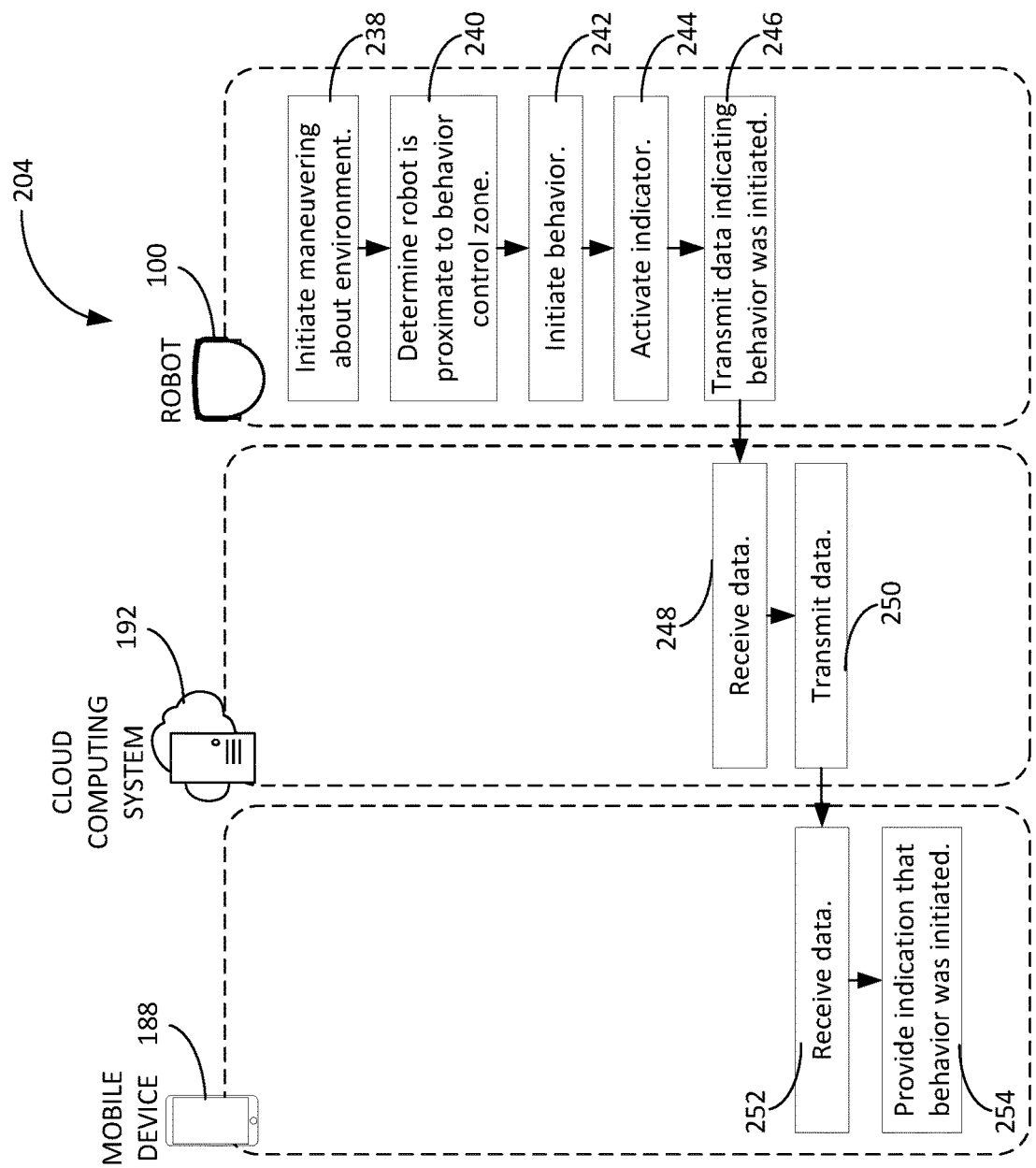
FIG. 5C is a flowchart of a process of controlling an autonomous mobile robot.

FIG. 5C illustrates an example of operations performed as part of the operation 204 to control the robot 100. At an operation 238, the robot 100 initiates maneuvering about the environment 20. For example, the robot 100 can initiate the autonomous cleaning operation in which the robot 100 autonomously maneuvers about the floor surface 10 while cleaning the floor surface using its vacuum system 119 and cleaning assembly 116 (shown in FIG. 3A). To cover a traversable portion of the floor surface 10, the robot 100 can initiate various movement behaviors during the autonomous cleaning operation. The movement behaviors can include, for example, a cornrow behavior in which the robot 100 moves in parallel rows across a portion of the floor surface and an obstacle-following behavior in which the robot 100 follows a perimeter of an obstacle FIG. 7B illustrates a movement path 327 as the robot 100 conducts an autonomous cleaning operation in which the robot 100 moves about the environment 20 to clean the floor surface 10.

Figure 7A:
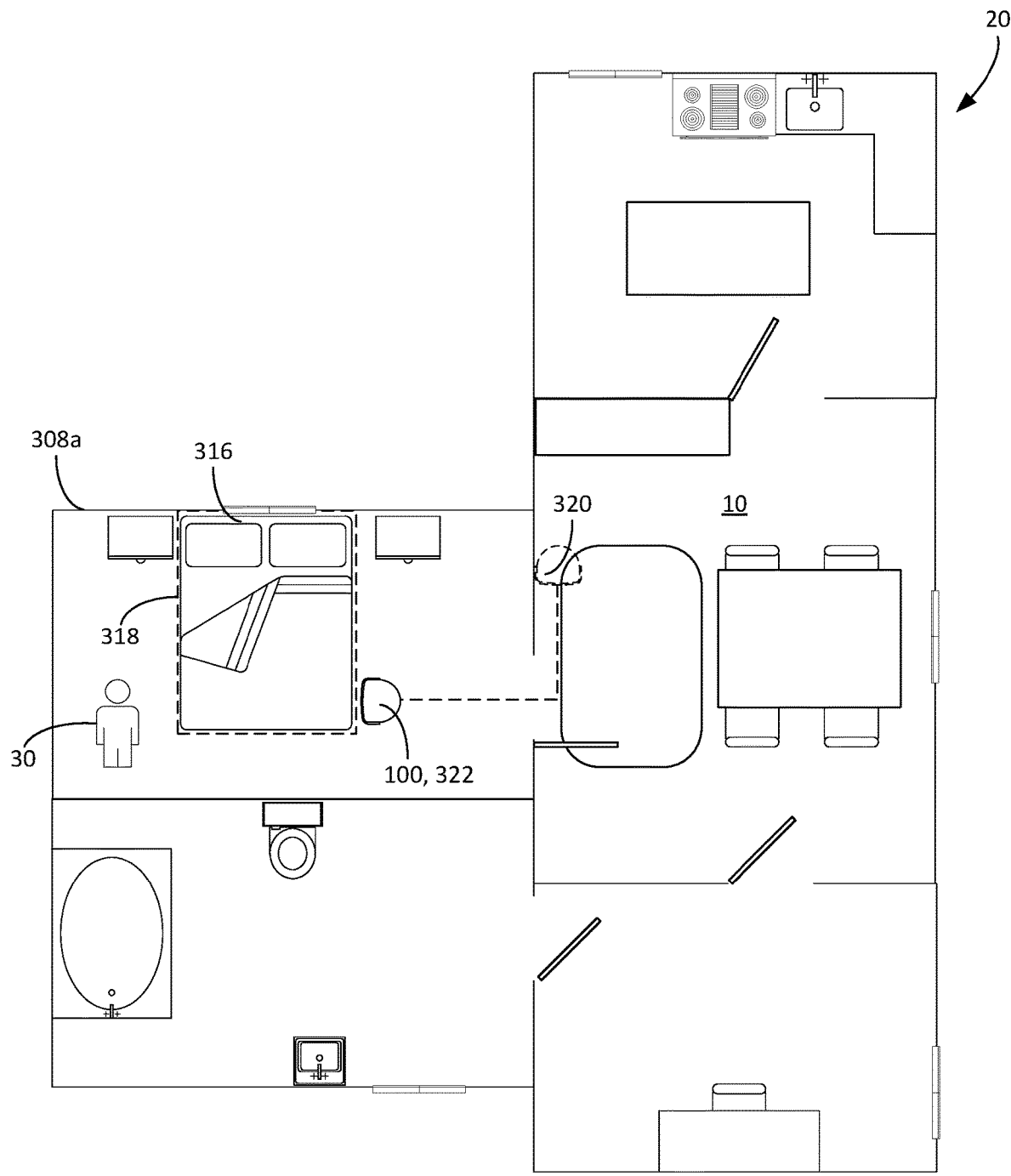
FIGS. 7A-7C are schematic top views of environments with behavior control zones.

Referring back to FIG. 5C, during the autonomous cleaning operation, the robot 100 determines that it is proximate to the behavior control zone 318 at an operation 240 and then initiates the behavior at an operation 242 in response to determining that the robot is proximate to the behavior control zone 318. The user 30 can set the behavior control zone 318 to prevent the robot 100 from moving under the bed 316 (shown in FIG. 7A) during the autonomous cleaning operation. The robot 100 can determine that it is proximate to the behavior control zone 318 using the sensor system of the robot 100. For example, the robot 100 can track its location using the sensor system and determine when its current location is proximate to the behavior control zone 318. In some implementations, if the behavior control zone 318 is associated with an object in the environment 20, the robot 100 can detect the object to determine that the robot 100 is proximate to the behavior control zone 318. In implementations in which the behavior control zone 318 is associated with the bed 316 (as shown in FIG. 7A), to determine that the robot 100 is proximate to the behavior control zone 318, the robot 100 can detect the bed 316 using one or more sensors of the sensor system of the robot 100.

Figure 7B:
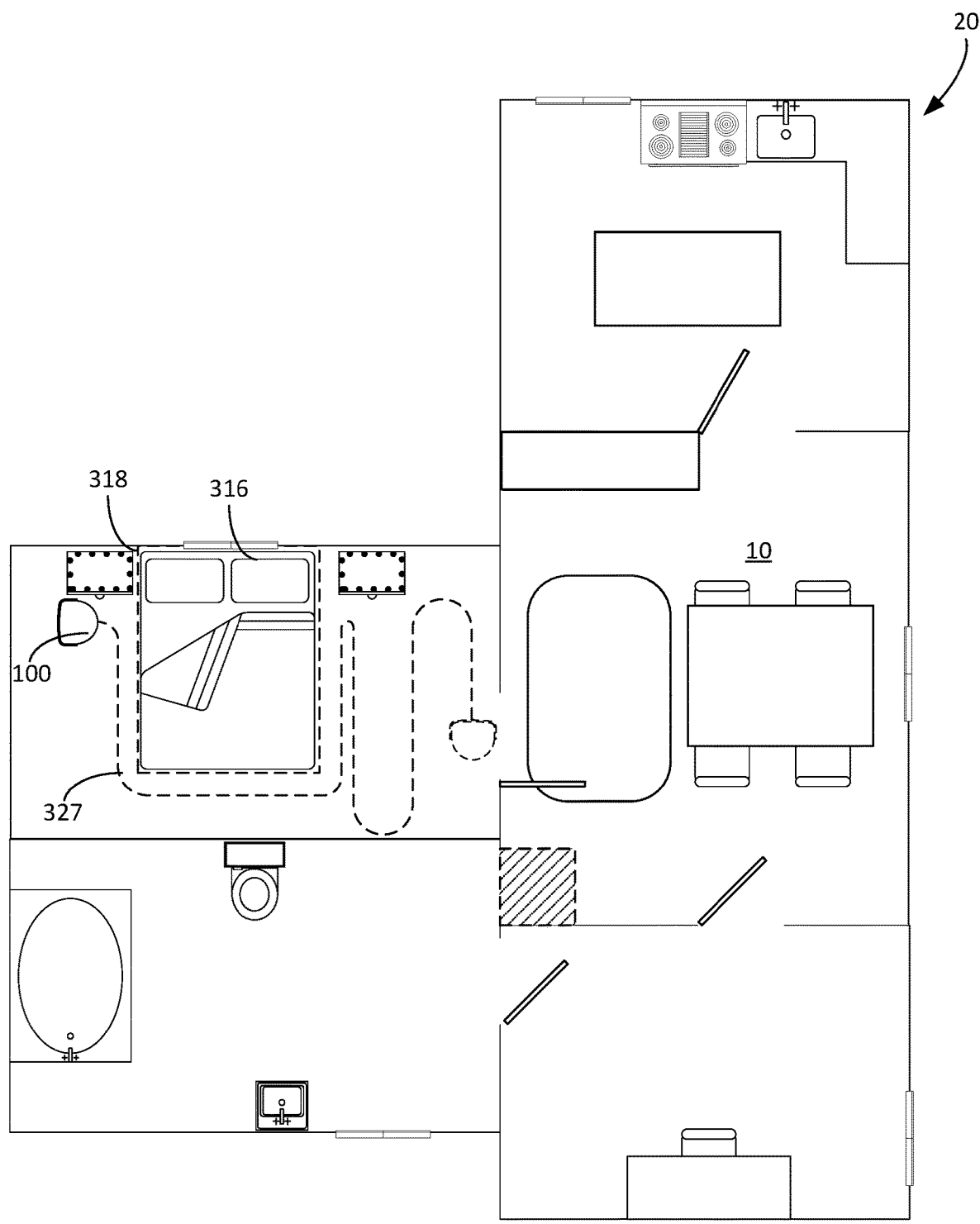

FIG. 7B illustrates an example of the behavior control zone 318 in which the behavior that the robot 100 initiates in response to detecting the behavior control zone 318 corresponds to a keep-out behavior. In the keep-out behavior, the robot 100 avoids entering the behavior control zone 318. As shown in FIG. 7B, the robot 100 can treat the behavior control zone 318 as an obstacle. Accordingly, the robot 100 can initiate an obstacle-following behavior in response to determining that the robot 100 is proximate to the behavior control zone 318. In the obstacle-following behavior, the robot 100 moves along a perimeter of the behavior control zone 318 and hence along a perimeter of the bed 316.

Referring back to FIG. 5C, the robot 100 can activate an indicator at an operation 244 to indicate the robot 100 is performing the behavior responsive to detecting the behavior control zone 318. For example, the robot 100 can activate the light indicator system 137 (shown in FIG. 3B) to illuminate at least a portion of the continuous loop 143 (shown in FIG. 3B) in response to the robot 100 being proximate the behavior control zone 318. The illuminated portion can indicate a direction of the behavior control zone 318 relative to the robot 100.

At operations 246, 248, 250, 252 and 254, the robot 100 can transmit data to cause the mobile device 188 to provide an indication to the user 30 that the robot 100 initiated the behavior in response to detecting the behavior control zone 318. The robot 100 can transmit data indicating that the behavior was initiated at the operation 246. At the operation 248, the cloud computing system 192 receives the data transmitted by the robot 100 at the operation 246. At the operation 250, the cloud computing system 192 transmits the data to the mobile device 188, and at the operation 252, the mobile device 188 receives the data. At the operation 254, the mobile device 188 provides the indication to the user 30 to indicate that the behavior associated with the behavior control zone 318 was initiated by the robot 100.

Figure 6C:
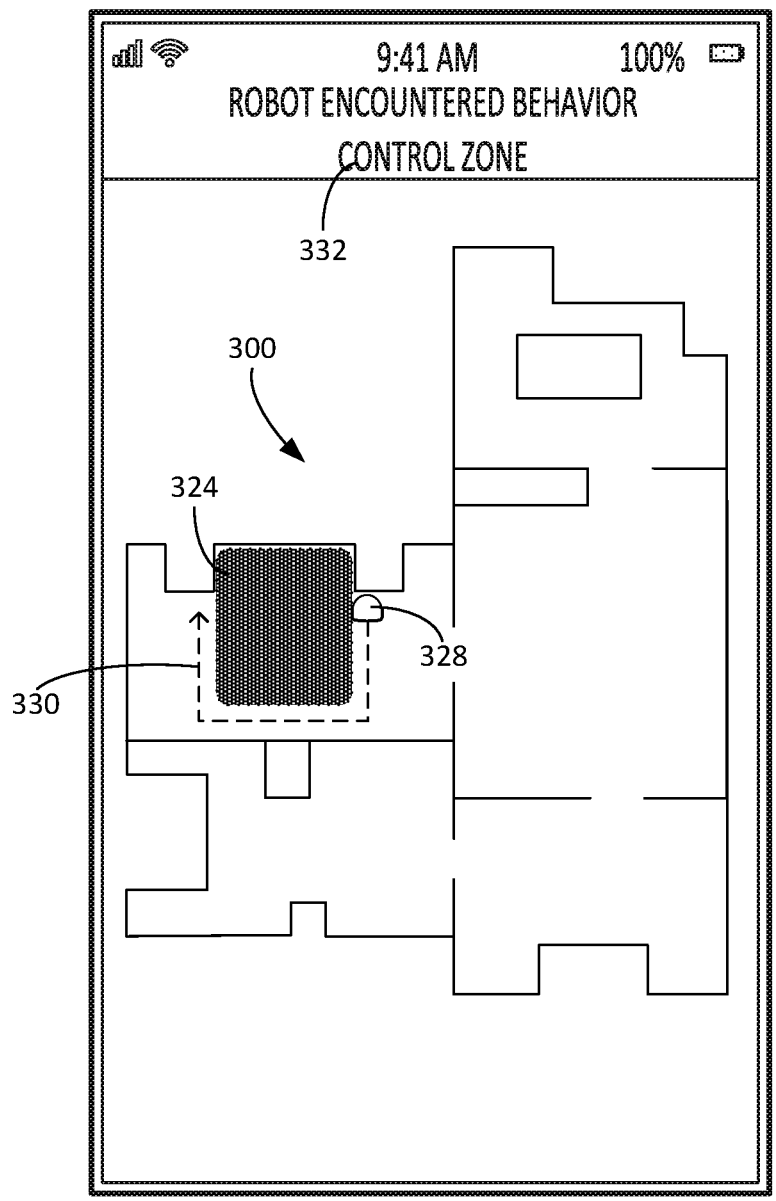

For example, referring to FIG. 6C, the mobile device 188 can present the map 300 with the indicator 324, an indicator 328 of the robot 100, and an indicator 330 of a path of the robot 100. The indicator 330 can show a path indicating that the robot 100 initiated the behavior to move along the path to avoid the behavior control zone 318. In addition, the mobile device 188 can present a message 332 indicating that the robot 100 encountered the behavior control zone 318.

In some implementations, the indication provided to the user 30 at the operation 254 can be part of a presentation of a mission status for the autonomous cleaning operation. In this regard, the mobile device 188 can provide information pertaining to a duration of the autonomous cleaning operation as well as information pertaining to whether the behavior control zone 318 was encountered during the autonomous cleaning operation, and how many times the behavior control zone 318 was encountered during the autonomous operation. In implementations in which multiple behavior control zones are established, the mobile device 188 can present information to the user 30 indicating which of the behavior control zones were encountered.

Referring back to FIG. 5A, the behavior control zone 318 can be updated at the operation 206, for example, in response to a change in the environment 20. For example, the behavior control zone 318 can be updated in response to movement of an object in the environment 20 associated with the behavior control zone 318 or removal of an object associated with the behavior control zone 318.

Figure 5D:
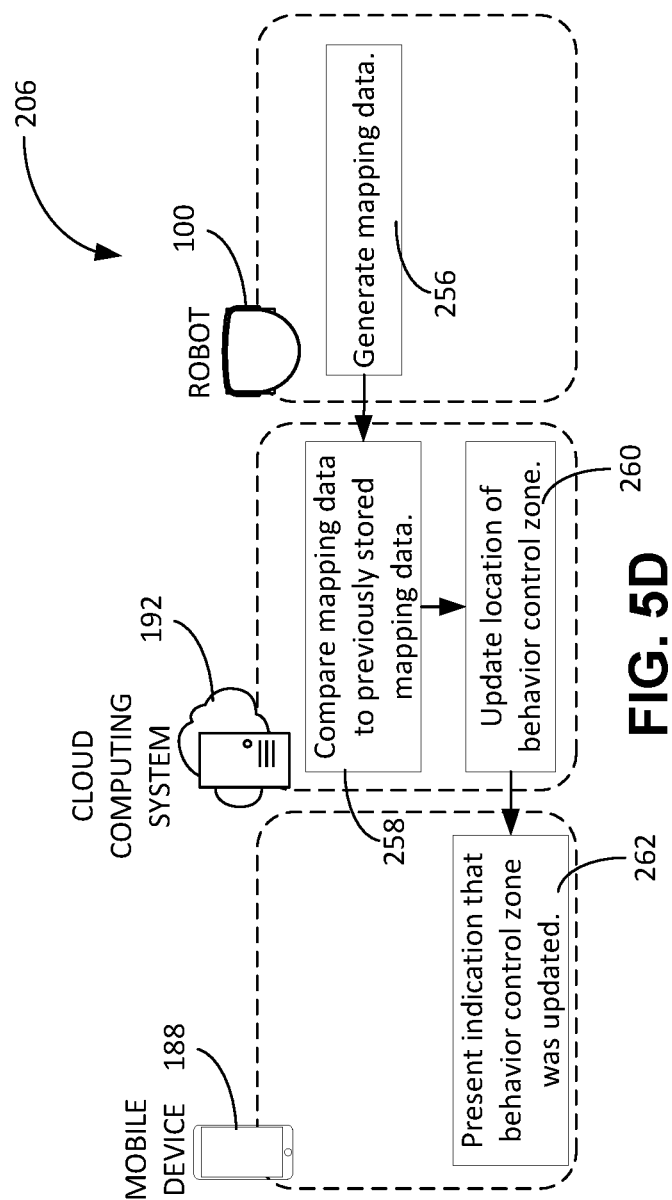
FIG. 5D is a flowchart of a process of updating a behavior control zone.

FIG. 5D illustrates an example process for the operation 206 in which the behavior control zone 318 is updated. At an operation 256, the robot 100 generates mapping data. The robot 100 can generate the mapping data during an autonomous cleaning operation. This autonomous cleaning operation can be the first autonomous cleaning operation performed after the behavior control zone 318 is established or can be a subsequent autonomous cleaning operation performed after the first autonomous cleaning operation. The mapping data can be generated using the sensor system of the robot 100 in a manner similar to that described with respect to the operation 208 of FIG. 5B.

At an operation 258, the cloud computing system 192 compares the mapping data generated at the operation 256 with previously generated mapping data, e.g., the mapping data generated at the operation 208 or mapping data generated during another autonomous cleaning operation. The robot 100 can transmit the mapping data to the cloud computing system 192 after generating the mapping data at the operation 256. From comparing the mapping data generated at the operation 256 with the previously stored mapping data, the cloud computing system 192 can determine whether the behavior control zone 318 established at the operation 202 has moved. In particular, if a location of an object associated with the behavior control zone 318 in the mapping data generated at the operation 256 differs from a location of the object in the previously stored mapping data, the cloud computing system 192 can determine that the behavior control zone 318 has moved.

Figure 7C:
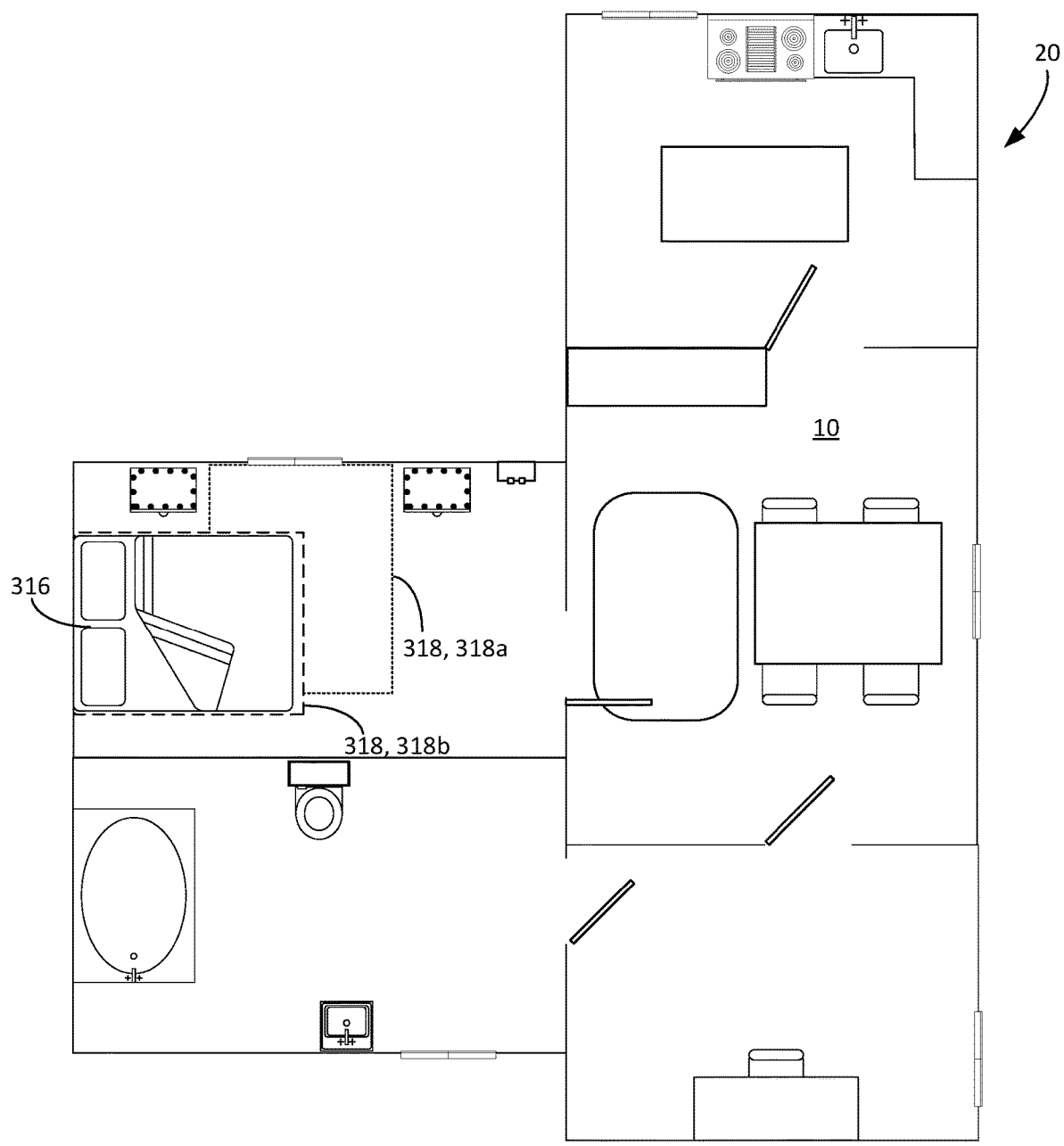

FIG. 7C illustrates an example in which the behavior control zone 318 is updated. The behavior control zone 318 can be updated in response to movement of the bed 316 from its original location to a new updated location. Because the bed 316 is associated with the behavior control zone 318, the location of the behavior control zone 318 is updated from its original location 318*a*, where the behavior control zone 318 covered a first portion of the floor surface 10, to the updated location 318*b*, where the behavior control zone 318 covers a second portion of the floor surface 10.

After determining from the mapping data that the behavior control zone should be updated, at an operation 260, the cloud computing system 192 can update the behavior control zone 318. In particular, the cloud computing system 192 can update a location of the behavior control zone 318. At an operation 262, the mobile device 188 can present an indication that the behavior control zone 318 was updated.

Figure 6D:
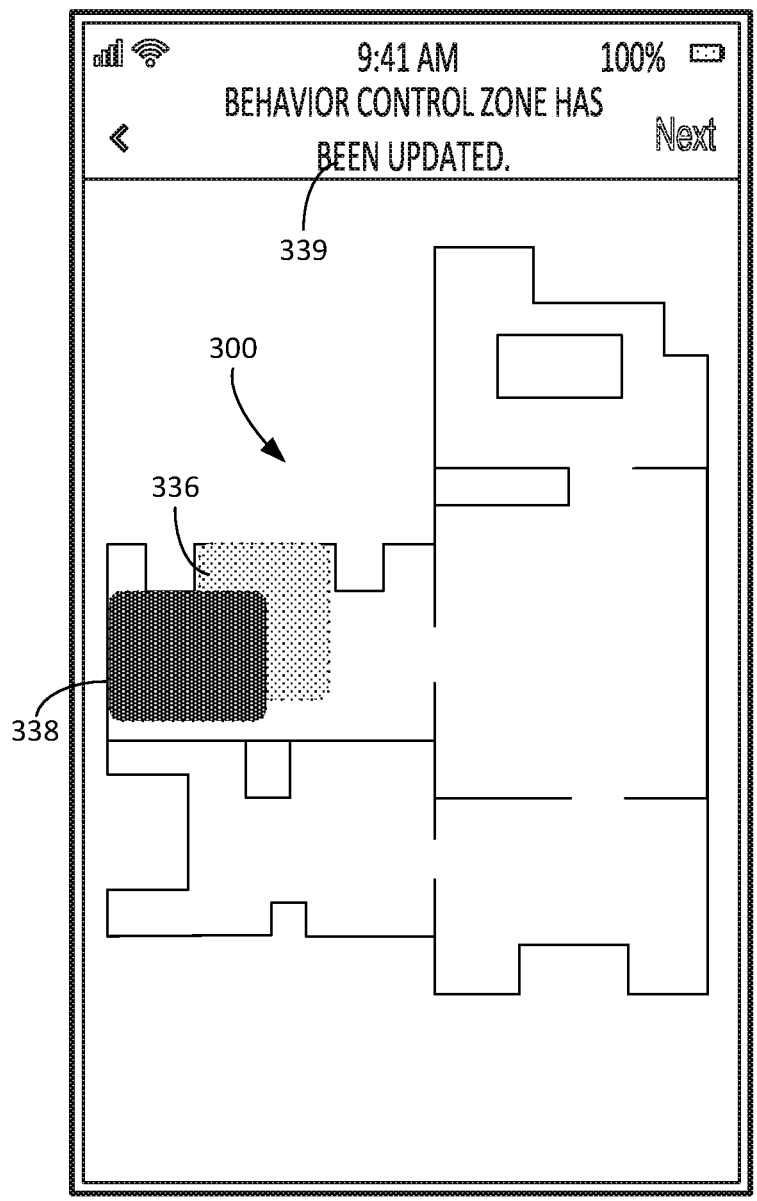

FIG. 6D illustrates an example of an indication presented on the mobile device 188 to indicate that the behavior control zone 318 has been updated. An indicator 336 overlaid on the map 300 indicates an old location of the behavior control zone 318 covering a first portion of the floor surface 10 (shown in FIG. 7C), and an indicator 338 overlaid on the map 300 indicates a new location of the behavior control zone 318 (shown in FIG. 7C) covering a second portion of the floor surface 10. The mobile device 188 can further present a message 339 indicating that the behavior control zone 318 has been updated. In some implementations, the mobile device 188 can present a request for confirmation of the proposed update to the behavior control zone 318 before updating the behavior control zone 318 as stored in the cloud computing system 192 or the robot 100.

Additional Alternative Implementations

A number of implementations, including alternative implementations, have been described. Nevertheless, it will be understood that further alternative implementations are possible, and that various modifications may be made.

The behavior that the robot 100 initiates in response to determining that the robot 100 is proximate to a behavior control zone can vary in implementations. For example, as described with respect to FIGS. 6C and 7B, in some implementations, the behavior control zone 318 can be a keep-out zone to ensure that the robot 100 does not enter the behavior control zone 318 during the autonomous cleaning operation. In some implementations, the robot 100 can initiate a behavior in which the robot 100 enters the behavior control zone but performs a cleaning operation at settings different from its settings outside of the behavior control zone. The robot 100 can adjust a vacuum power delivered to the vacuum system 119 (shown in FIG. 3A) of the robot 100, adjust a movement speed of the robot 100, adjust a movement direction of the robot 100, or adjust an orientation of the robot 100 relative to the behavior control zone. To set the specific behavior that the robot initiates in response to determining that the robot 100 is proximate to the behavior control zone, the user 30 can operate the mobile device 188, e.g., during the operation 202 to establish the behavior control zone. For example, when the user 30 provides the input to establish the behavior control zone at the operation 220, the user 30 can also select a behavior that the robot 100 is to initiate in response to detecting the behavior control zone.

In some implementations, the behavior control zone can be selected to cause the robot 100 to initiate a focused cleaning behavior in response to determining that the robot 100 is proximate to the behavior control zone. The robot 100 performs the focused cleaning behavior as the robot 100 moves through an interior of the behavior control zone. The robot 100 can adjust a vacuum power delivered to the vacuum system 119 (shown in FIG. 3A). In particular, a vacuum power delivered to the vacuum system 119 of the robot 100 as the robot 100 traverses the behavior control zone can be greater than a vacuum power delivered to the vacuum system 119 as the robot traverses a portion of the floor surface 10 outside the behavior control zone. In some implementations, in the focused clean behavior, the robot 100 can adjust a movement speed of the robot 100. The robot 100 can decrease a movement speed of the robot 100 relative to a movement speed of the robot 100 as the robot 100 traverses a portion of the floor surface 10 outside of the behavior control zone. Alternatively or additionally, in the focused cleaning behavior, the robot 100 can adjust a movement pattern of the robot 100. The robot 100 can move in a spiral pattern, a cornrow pattern, or other appropriate movement pattern within the behavior control zone.

Figure 8A:
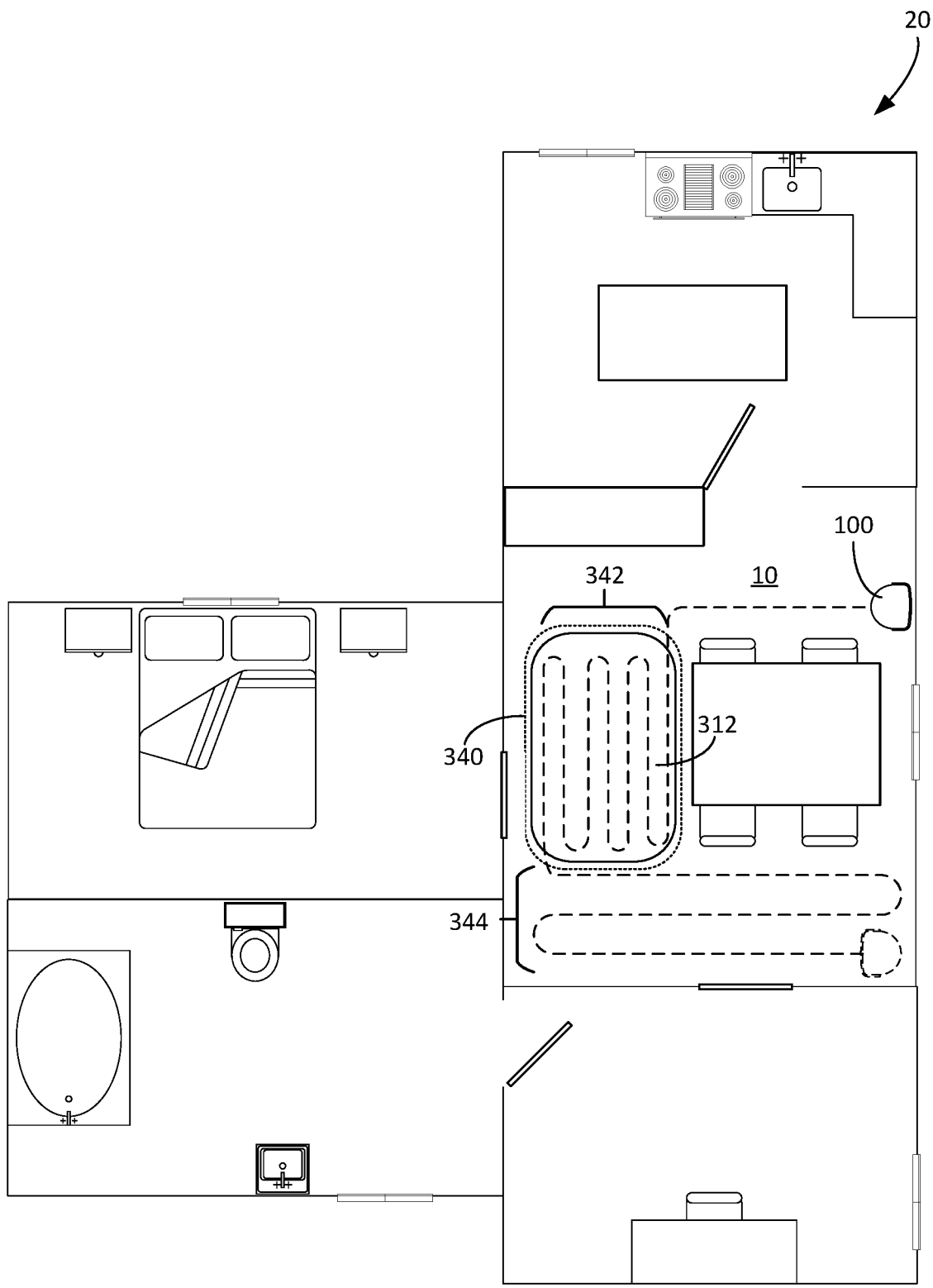
FIGS. 8A and 8B are schematic top views of environments with behavior control zones.

FIG. 8A illustrates an example in which a behavior control zone is set to cause the robot 100 to initiate a focused cleaning behavior. In this example, a behavior control zone 340 associated with the area rug 312 is established, e.g., at the operation 202 (described with respect to FIG. 5A). The robot 100, in an autonomous cleaning operation, initiates a behavior upon entering the behavior control zone 340. The behavior can be a focused cleaning behavior as described herein. For example, a movement pattern of the robot 100 can be adjusted. The robot 100 can move in a cornrow pattern 342 in the behavior control zone 340 with rows that are more closely spaced together than rows of a cornrow pattern 344 outside of the behavior control zone 340. The robot 100 can, in some cases, move in a movement pattern in which the robot 100 moves over the same portion of the floor surface 10 multiple times. Alternatively or additionally, the robot 100 can increase the vacuum power delivered to its vacuum system and/or decrease its movement speed as the robot 100 traverses the behavior control zone 340. The behavior control zone 340 can allow the robot 100 to more effectively clean the area rug 312.

Figure 8B:
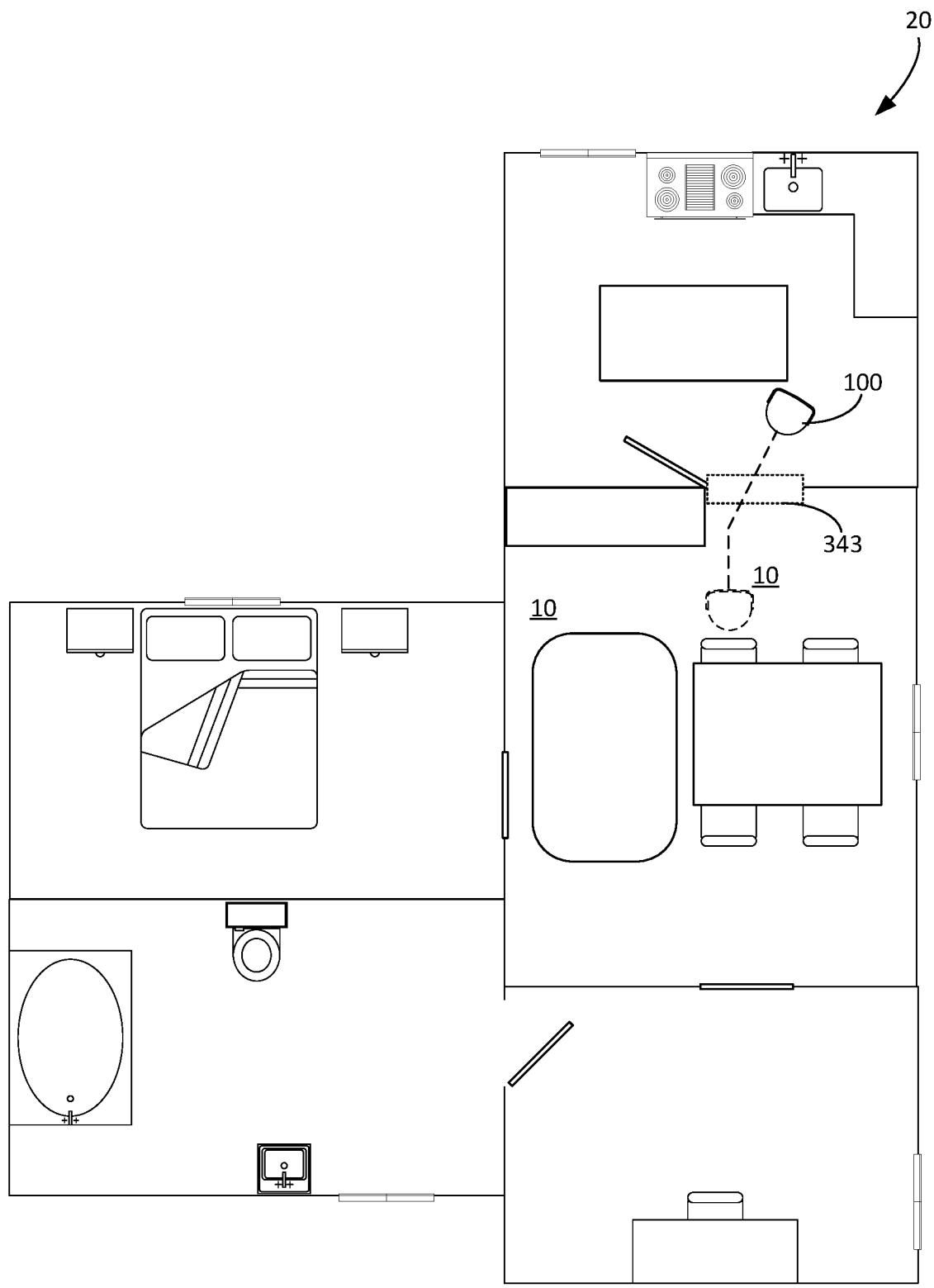

FIG. 8B illustrates an example in which a behavior control zone is set to cause the robot 100 to move through a behavior control zone at an angle. In this example, a behavior control zone 343 can be associated with a threshold between the kitchen 308e and the dining room 308d. The robot 100, in an autonomous cleaning operation, initiates a behavior in response to being proximate to the behavior control zone 343. The threshold between the kitchen 308e and the dining room 308d can be more easily traversed by the robot 100 if the robot 100 moves across the threshold at an angle. In this regard, a movement angle of the robot 100 relative to the behavior control zone 343 can be adjusted before the robot 100 traverses the behavior control zone 343. The robot 100 can move at an angle relative to the behavior control zone 343 and hence at an angle relative to the threshold between the kitchen 308e and the dining room 308d.

Figure 9:
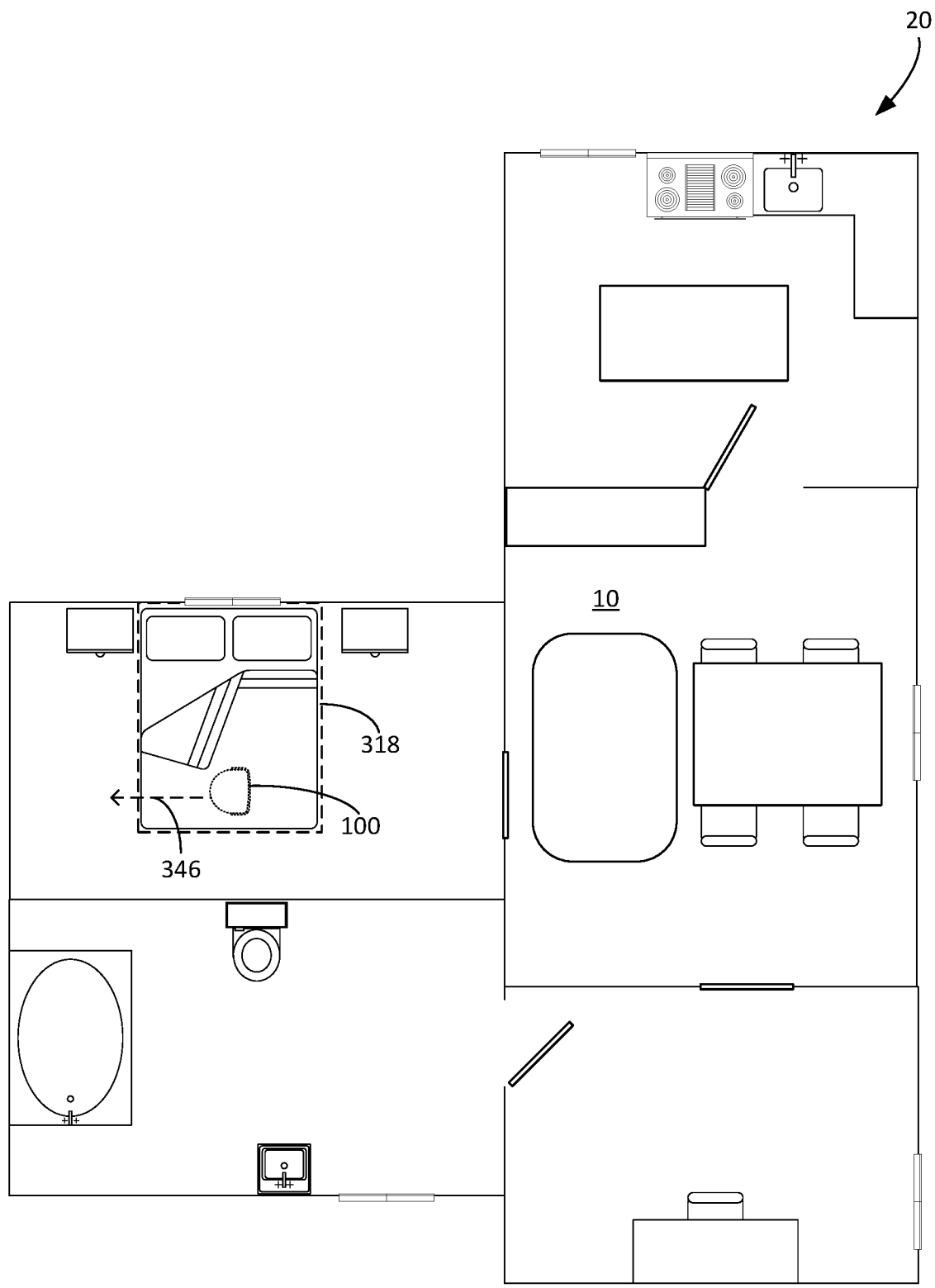
FIG. 9 is a schematic top view of an environment with an autonomous mobile robot in a behavior control zone.

In some implementations, the behavior control zone is a keep-out zone, and the robot 100 becomes positioned within the behavior control zone. For example, the robot 100 can be placed manually in the behavior control zone by a user, or the robot 100 can autonomously move into the behavior control zone. In examples in which the robot 100 autonomously moves into the behavior control zone, the robot 100 may initiate an escape behavior in which the robot 100 follows a path to move out of the behavior control zone. Referring to FIG. 9, the robot 100 is positioned within the behavior control zone 318. The robot 100 moved into the behavior control zone during an autonomous cleaning operation. In determining its location using the sensor system, the robot 100 determines that it moved into the behavior control zone without triggering the behavior to be initiated in response to the robot 100 being proximate to the behavior control zone 318 (described in connection with the operations 242, 244 of FIG. 5C). Such a circumstance could occur due to sensor error or other sources of error for estimating a location of the robot 100 within the environment 20.

In response to detecting that the robot 100 is within the behavior control zone 318, the robot 100 can be maneuvered along a path 346 out of the behavior control zone 318. The path 346 can correspond to the path that the robot 100 followed to enter into the behavior control zone. The robot 100 moves along the path 346 in a first direction to enter into the behavior control zone 318, and moves along the path 346 in a second direction out of the behavior control zone 318.

In some implementations, the robot 100 is within the behavior control zone 318 and determines that the robot 100 did not autonomously move into the behavior control zone 318 but rather was manually placed in the behavior control zone 318, e.g., by a user. In such a circumstance, in response to detecting the robot 100 is within the behavior control zone 318, an initiation of an operation of the robot 100 can be prevented. For example, if the user 30 attempts to initiate an autonomous cleaning operation or other operation in which the robot 100 moves, the operation is prevented in response to detecting that the robot 100 is within the behavior control zone 318.

Figure 10:
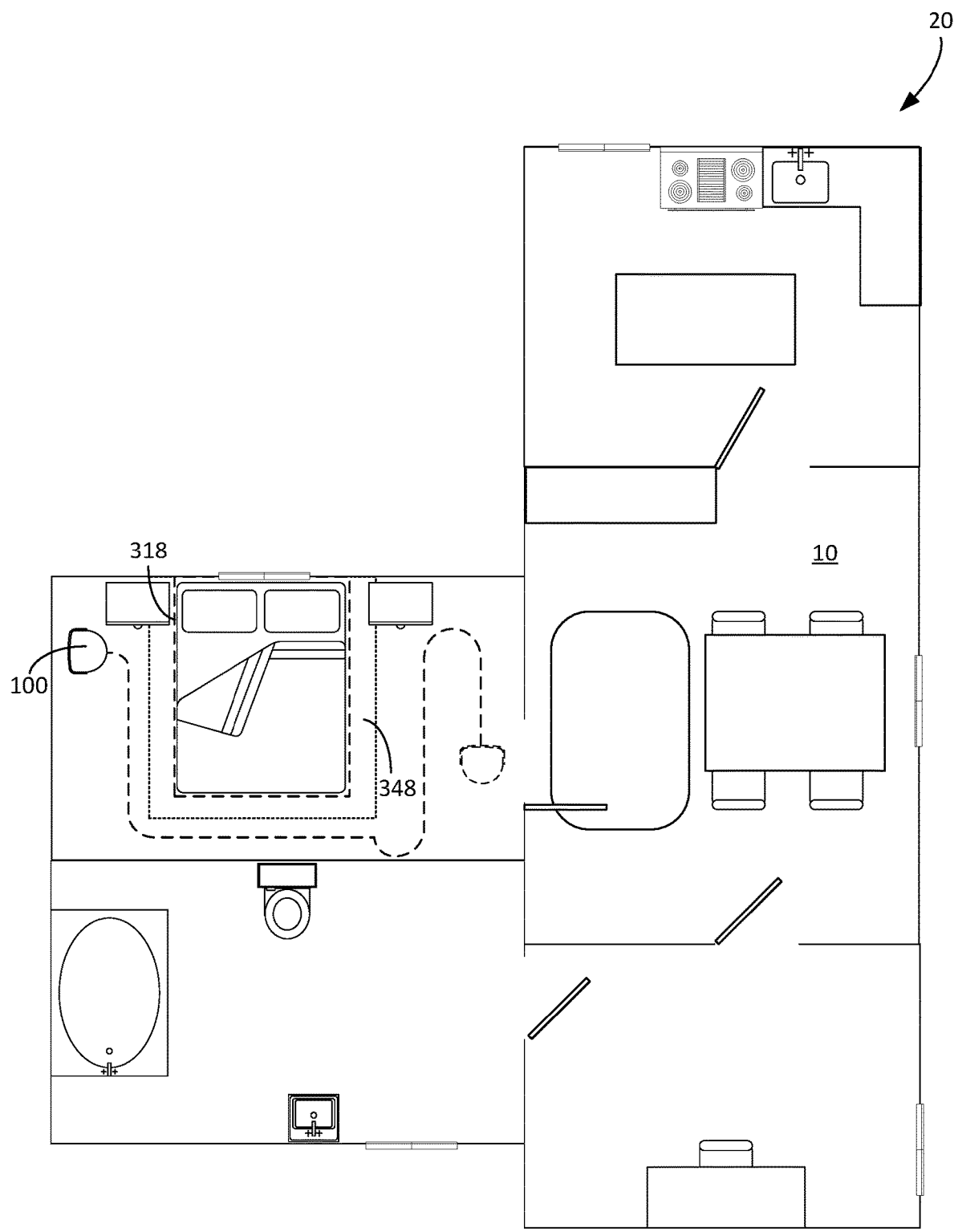
FIG. 10 is a schematic top view of an environment with a behavior control zone and a buffer zone.

As described herein, a behavior control zone can have a perimeter, and the behavior of the robot 100 can be triggered in response to being proximate to the perimeter of behavior control zone or to being within the perimeter of behavior control zone. In some implementations, the robot 100 initiates the behavior in response to being within a buffer zone around the behavior control zone. Referring to FIG. 10, a buffer zone 348 is positioned around the behavior control zone 318. The robot 100 can be responsive to being within the buffer zone 348 to ensure that the robot 100 does not, due to localization uncertainty, enter into the behavior control zone 318. In some implementations, absent a buffer zone, an uncertainty associated with estimating a location of the robot 100 can result in the robot 100 entering the behavior control zone 318 without determining that the robot 100 is proximate or within the behavior control zone 318. A size of the buffer zone 348 can be selected based on an uncertainty associated with the estimations of the location of the robot 100. An uncertainty associated with data indicative of locations of the robot 100 can be estimated, and the size of the buffer zone 348 can be selected based on this estimated uncertainty. In some implementations, the size of the buffer zone 348 is proportional to the estimated uncertainty and can change as the estimated uncertainty changes.

In some implementations, rather than being proportional to the estimated uncertainty or being selected based on the estimated uncertainty, the buffer zone 348 is selected by the user 30 using, for example, the mobile device 188. For example, the user 30 can select a size of the buffer zone 348 using the mobile device 188.

Figure 11:
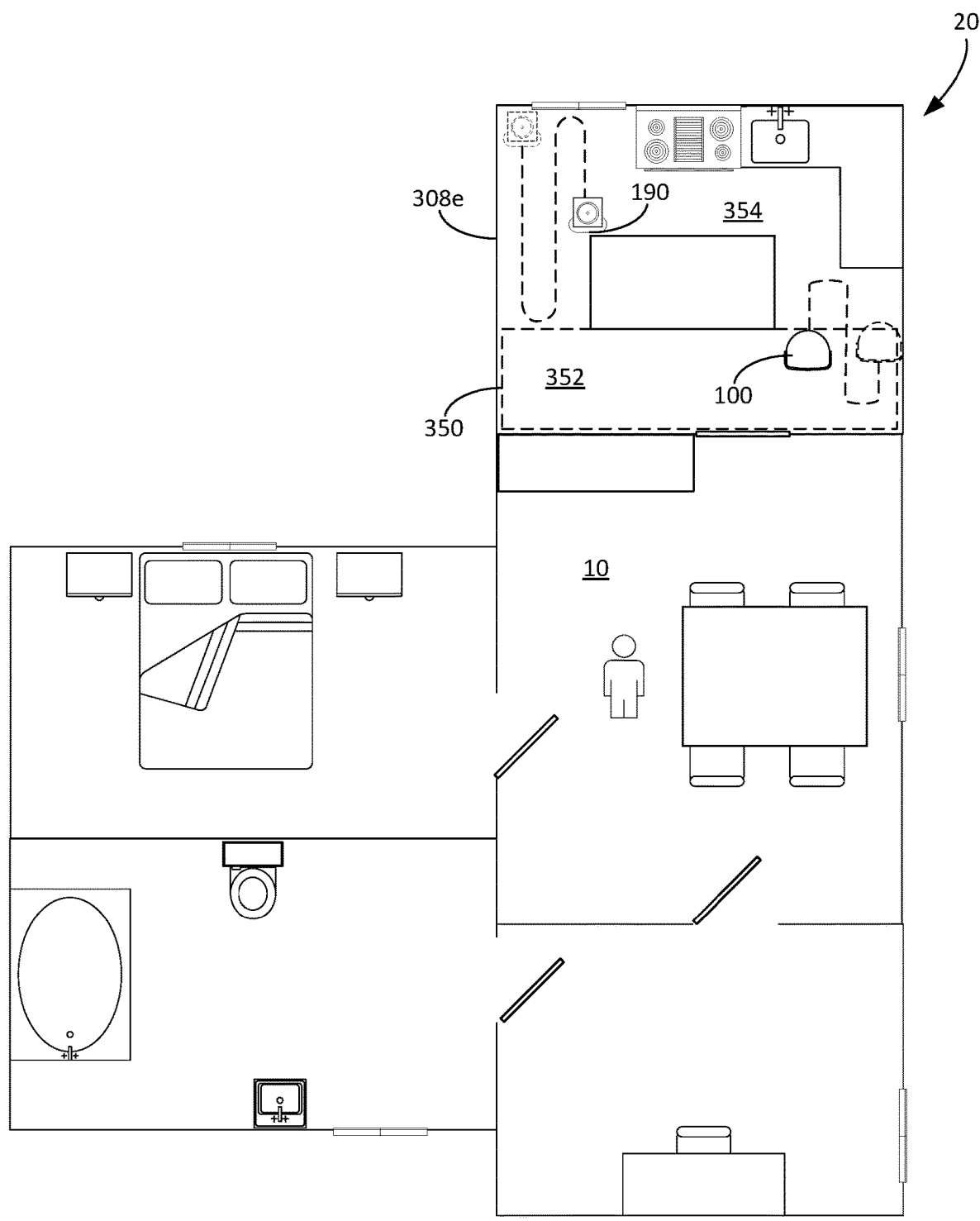
FIG. 11 is a schematic top view of an environment with multiple robots and a behavior control zone.

The robot 100 is described as a vacuum cleaning robot. Other types of robots can be used in certain implementations. In some implementations, behavior control zones are used in connection with an autonomous mopping robot. For example, referring to FIG. 11, the robot 100 and the robot 190 (e.g., described in connection with FIG. 4) are located in the environment 20. The robot 100 is a vacuum cleaning robot as described herein. The autonomous mobile robot 190 is an autonomous mopping robot. The robot 190 can carry a cleaning pad configured to wipe the floor surface 10 as the robot 190 moves about the floor surface 10. The robot 190 can also apply fluid onto the floor surface 10, e.g., by spraying fluid onto the floor surface 10. For focused cleaning modes, the robot 190 can press the cleaning pad more firmly onto a portion of the floor surface 10, can spray more water onto the portion of the floor surface 10, or pass over the portion of the floor surface multiple times.

A behavior control zone can be set such that the robot 100 and the robot 190 respond differently to being proximate to the behavior control zone. For example, the floor surface 10 in the kitchen 308e can have two different floor types: a carpet portion 352 and a hardwood portion 354. A behavior control zone 350 for the carpet portion 352 of the floor surface 10 can be established, e.g., in accordance with the operations described respect to FIG. 5B.

Because the robot 100 is a vacuum cleaning robot and the robot 190 is a mopping robot, the behavior control zone 350 corresponding to the hardwood portion 354 of the floor surface 10 is established such that the robot 100 can enter and clean the behavior control zone 350 while the robot 190 avoids entering the behavior control zone 350. In this regard, the behavior control zone 350 is treated as a keep-out zone by the robot 190. In some implementations, the behavior control zone 350 is ignored by the robot 100. In some implementations, the behavior control zone 350 is treated as a focused cleaning zone by the robot 100.

Figure 12:
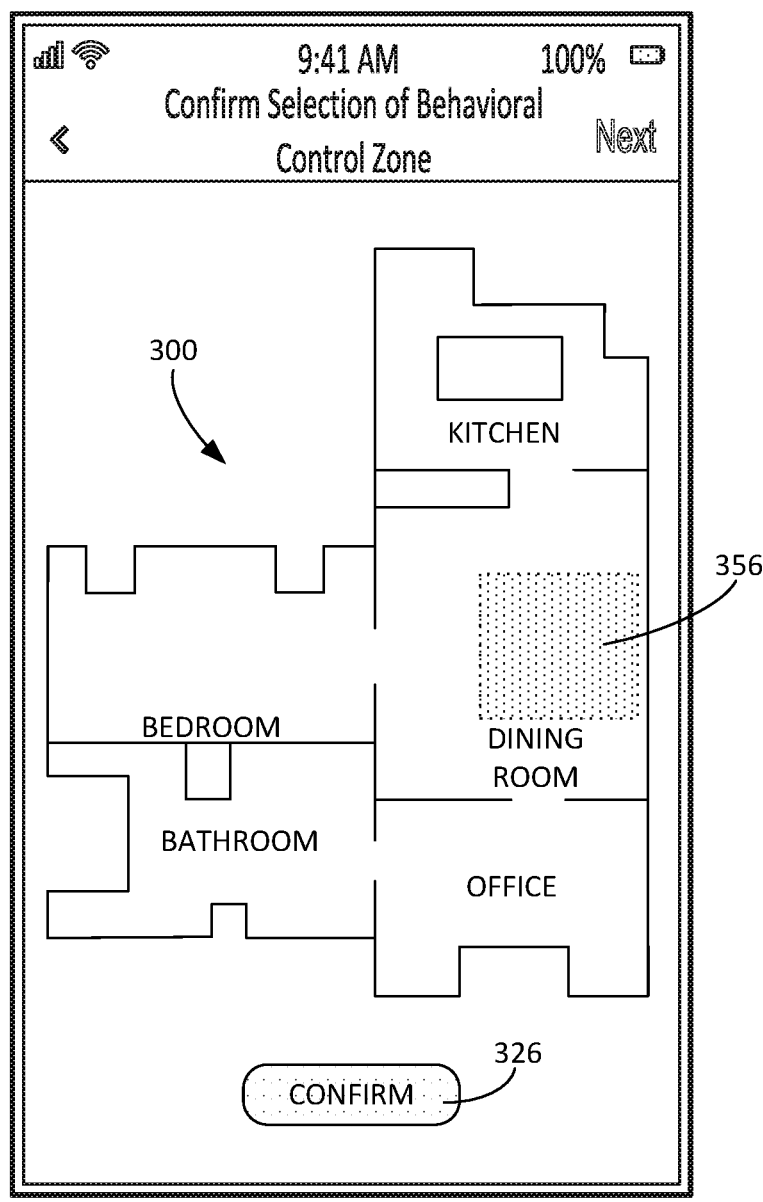
FIG. 12 is an illustration of a user interface providing an indication of a behavior control zone.
Figure 13:
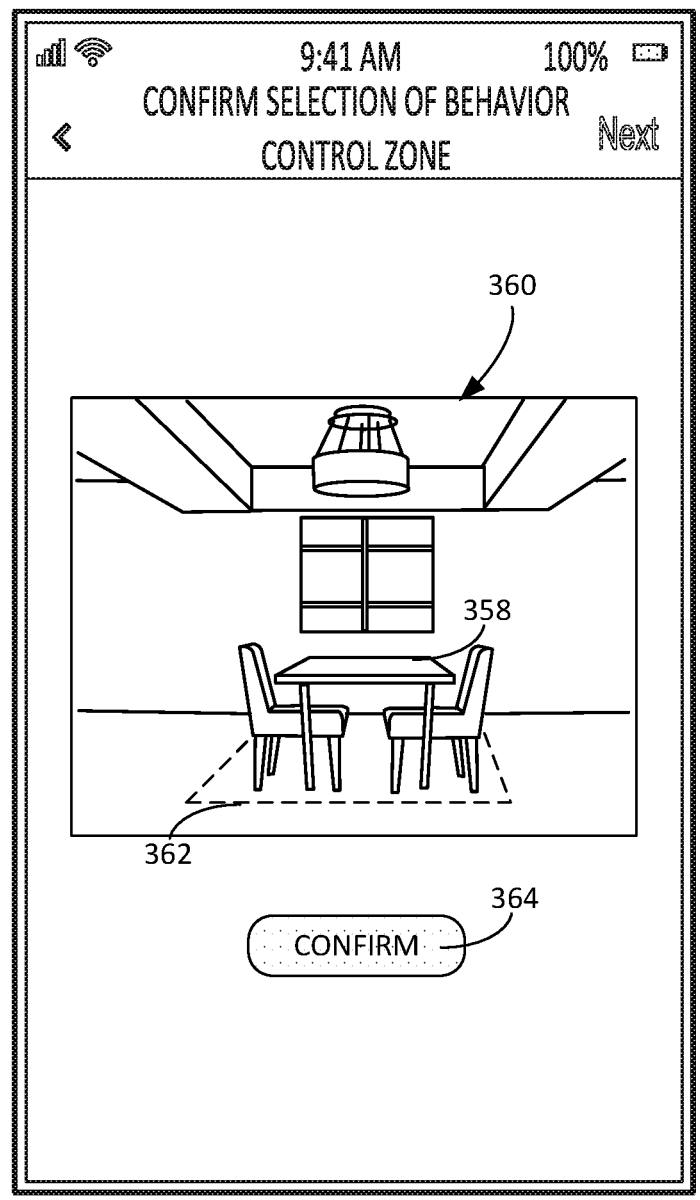
FIGS. 13 and 14 are images of a portion of an environment overlaid with indicators of behavior control zones.

In some implementations, referring to FIG. 12, the mobile device 188 presents, on the map 300, an indicator 356 indicating the bounds of a behavior control zone. Referring briefly back to FIG. 1, the behavior control zone corresponding to the indicator 356 can be an area under a dining table 358 in the dining room 308d. In some implementations, referring to FIG. 13, in an augmented reality mode, an image 360 of the environment 20 can be presented on the mobile device 188, and an indicator 362 indicative of the behavior control zone is overlaid on the image 360 of the environment 20. In some implementations, the mobile device 188 can present a "confirm" button 364 to allow the user 30 to confirm the behavior control zone shown in the image 360. The user 30 can select the "confirm" button 364 to provide confirmation of the behavior control zone as described herein.

Figure 14:
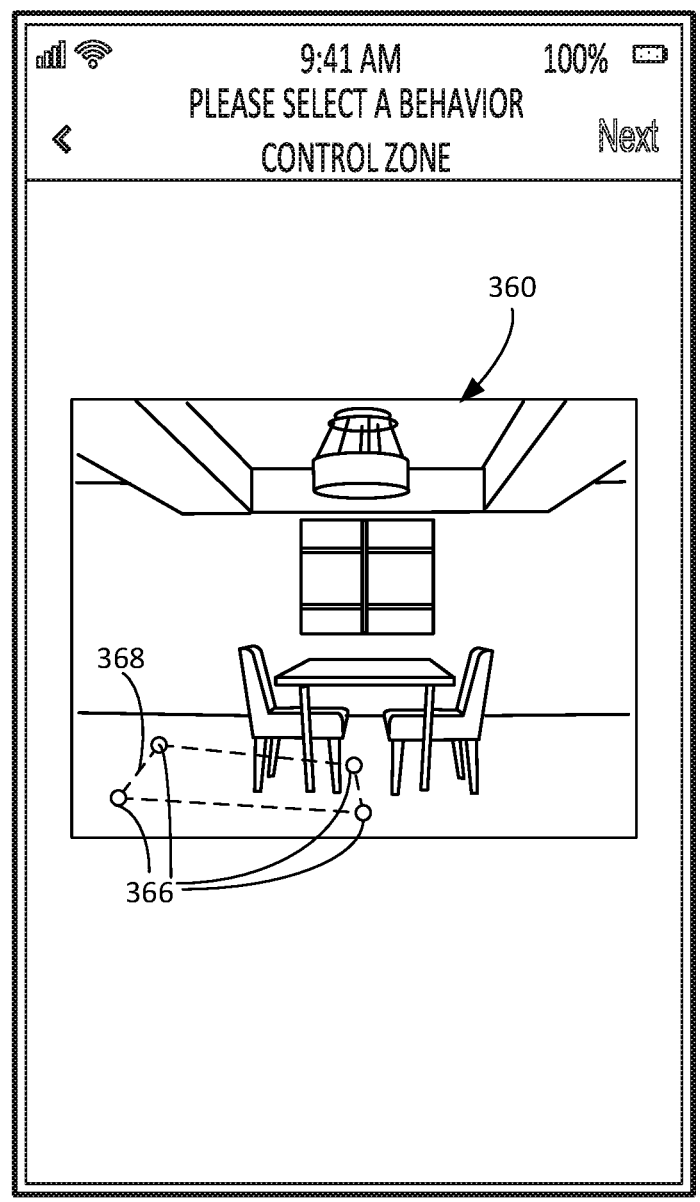

In some implementations, the user 30 can select the behavior control zone, in the augmented reality mode, by selecting portions of the image 360. For example, the user 30 could select an object represented in the image 360, such as the dining table 358. If the representation of the dining table 358 is selected, for example, a behavior control zone, such as the one represented by the indicator 362 can be established. In some implementations, as shown in FIG. 14, in the augmented reality mode, the user 30 can draw the behavior control zone in the augmented reality mode. The user 30 can select one or more locations on the image 360 to establish the behavior control zone. The user 30 can, for example, select points 366 along a representation 368 of a boundary of the behavior control zone. Alternatively, the user 30 can select a point and then, for example, using a touch screen of the mobile device 188, drag their digit to define a region defining the behavior control zone.

Figure 15A:
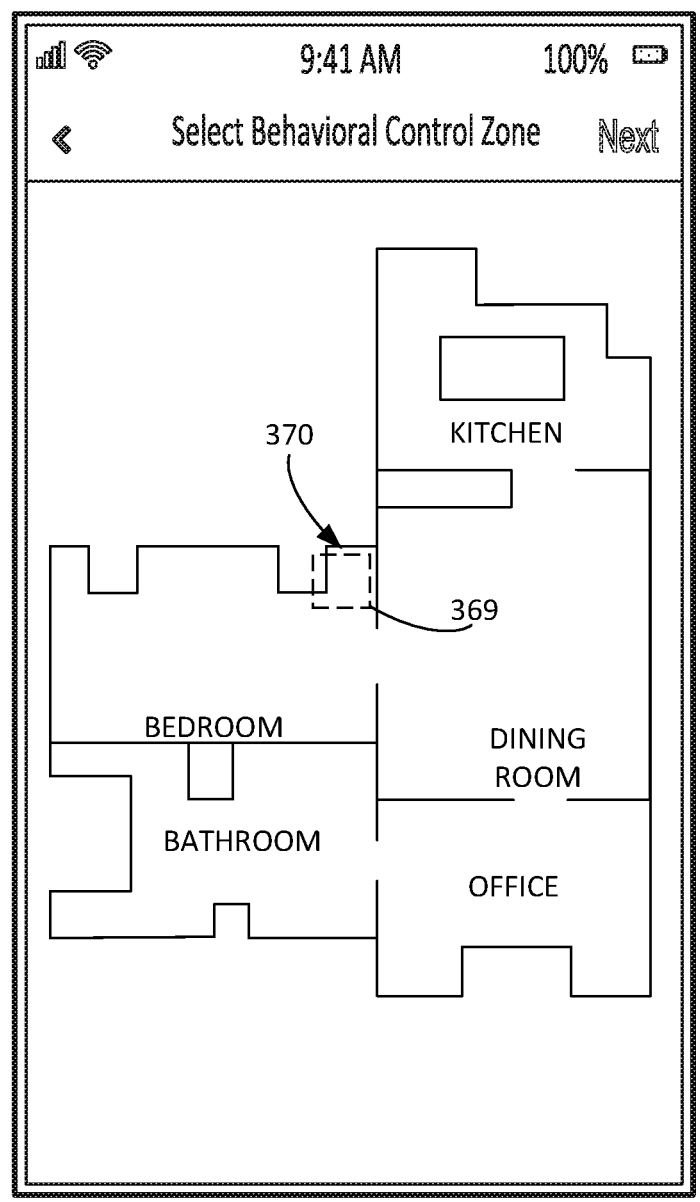
FIGS. 15A-15B, 16A-16B, and 17A-17B are illustrations of user interfaces for a mobile device.
Figure 15B:
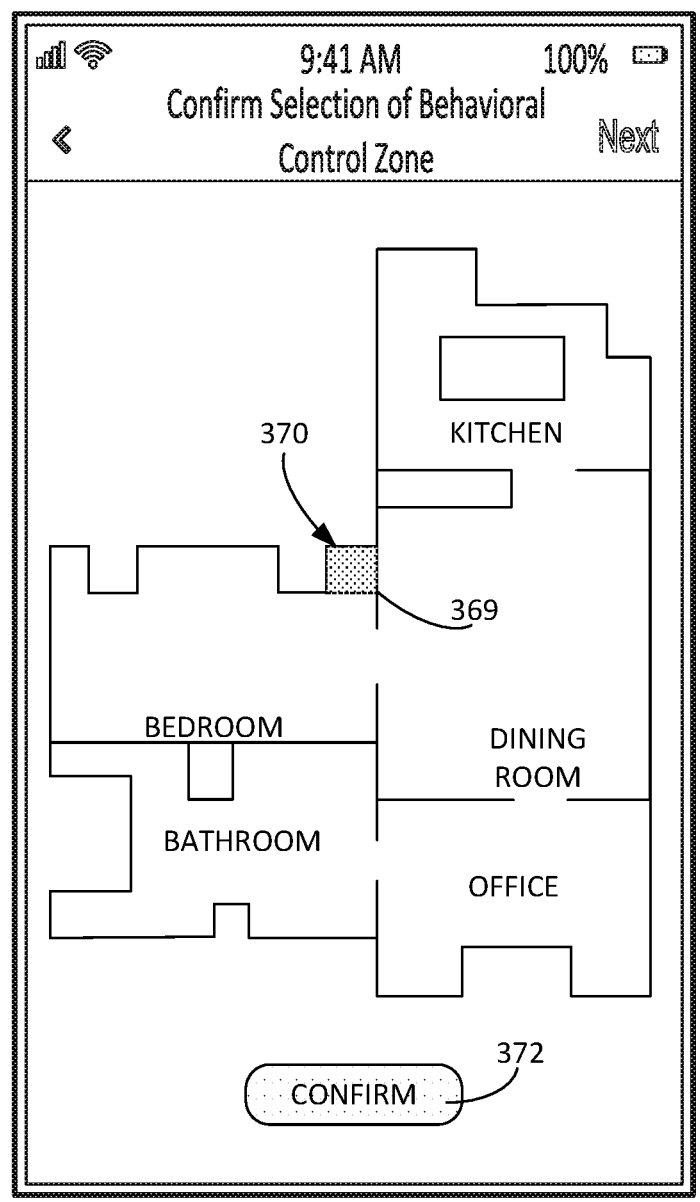

In some implementations, a behavior control zone manually selected by a user can be adjusted by a computing system to conform to features in the environment. For example, referring to FIG. 15A, the user 30 defines a behavior control zone 369 manually. The user 30 can define the behavior control zone 369 to cover a region 370 in a corner of a room. The manually defined behavior control zone 369 may not cover an entirety of the region, due to, for example, user error or imprecision. Referring to FIG. 15B, the behavior control zone 369 is updated to conform to geometry of the region 370 in the corner of the room. Edges of the behavior control zone 369 can be updated to align with edges of walls of the room and edges with an obstacle in the room. The edges of the behavior control zone 369 can be updated to align with edges of nontraversable portions of the environment, such as walls and obstacles. Based on the user's initial definition of the behavior control zone 369 and based on features in the environment proximate to the behavior control zone 369, the mobile device 188 (or other device) can determine the user's intended scope for the behavior control zone 369. The user 30 can confirm the updated behavior control zone 369 by selecting a confirm button 372. In some implementations, a user defines a behavior control zone to cover an area rug or other feature in an interior portion of a room. This feature may be surrounded by traversable area. The edges of the behavior control zone can be updated to match edges of the feature in the interior portion of the room.

Figure 16A:
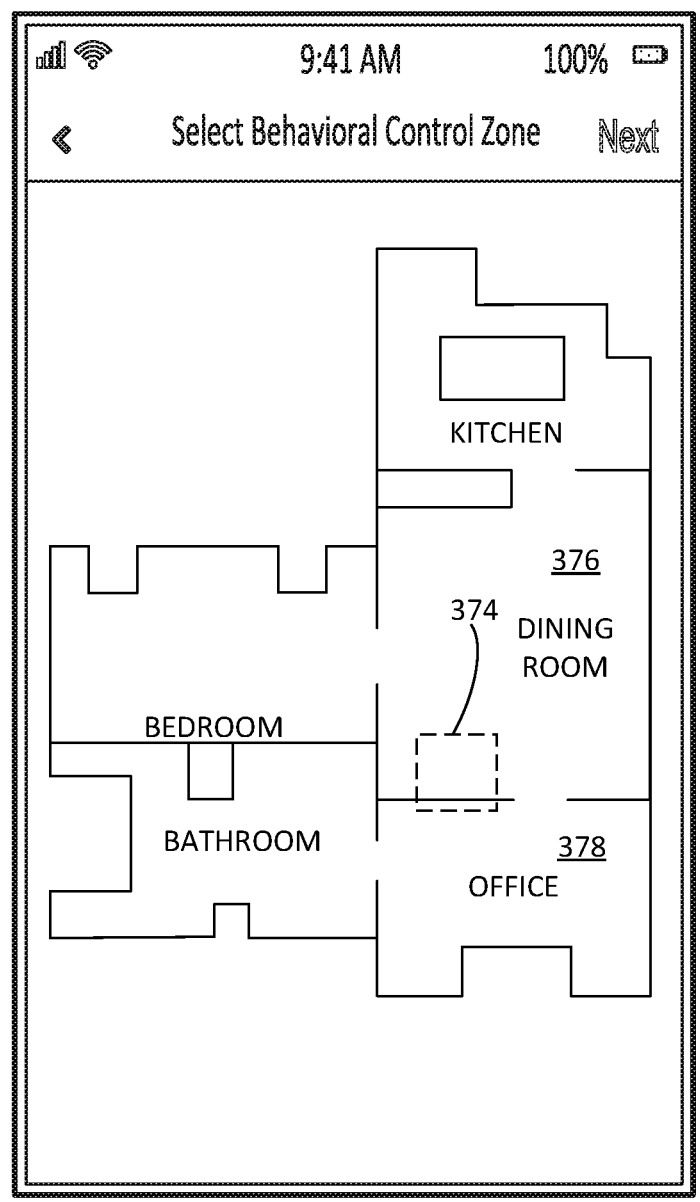
Figure 16B:
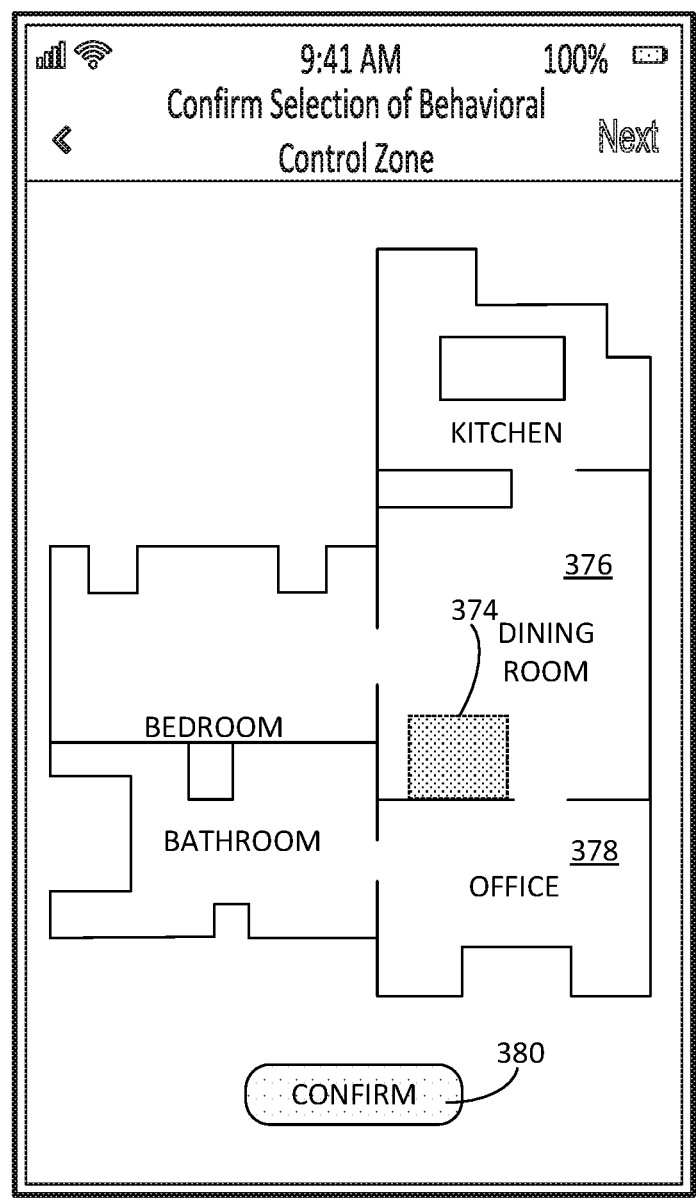

In further examples, referring to FIG. 16A, the user 30 can manually define a behavior control zone 374 that inadvertently spans multiple rooms, e.g., a first room 376 and a second room 378. The mobile device 188 (or other device) can determine the user's intended scope for the behavior control zone 374 and determine that the user 30 intended to only define the behavior control zone 374 to span the first room 376. For example, the mobile device 188 may determine that the portion of the behavior control zone 374 in the first room 376 is more than 70%, 80%, or 90% of the total area covered by the behavior control zone 374. Alternatively, the mobile device 188 may determine that the portion of the behavior control zone in the second room 378 is less than 20%, 10%, or 5% of the total area covered by the behavior control zone 374. In this regard, referring to FIG. 16B, the mobile device 188 can update the behavior control zone 374 to snap to features of the first room 376 such that the behavior control zone 374 extends through only the first room 376 and not the second room 378. For example, the behavior control zone 374 can snap to walls or other obstacles in the first room 376. The user 30 can confirm the updated behavior control zone 374 by selecting a confirm button 380.

Figure 17A:
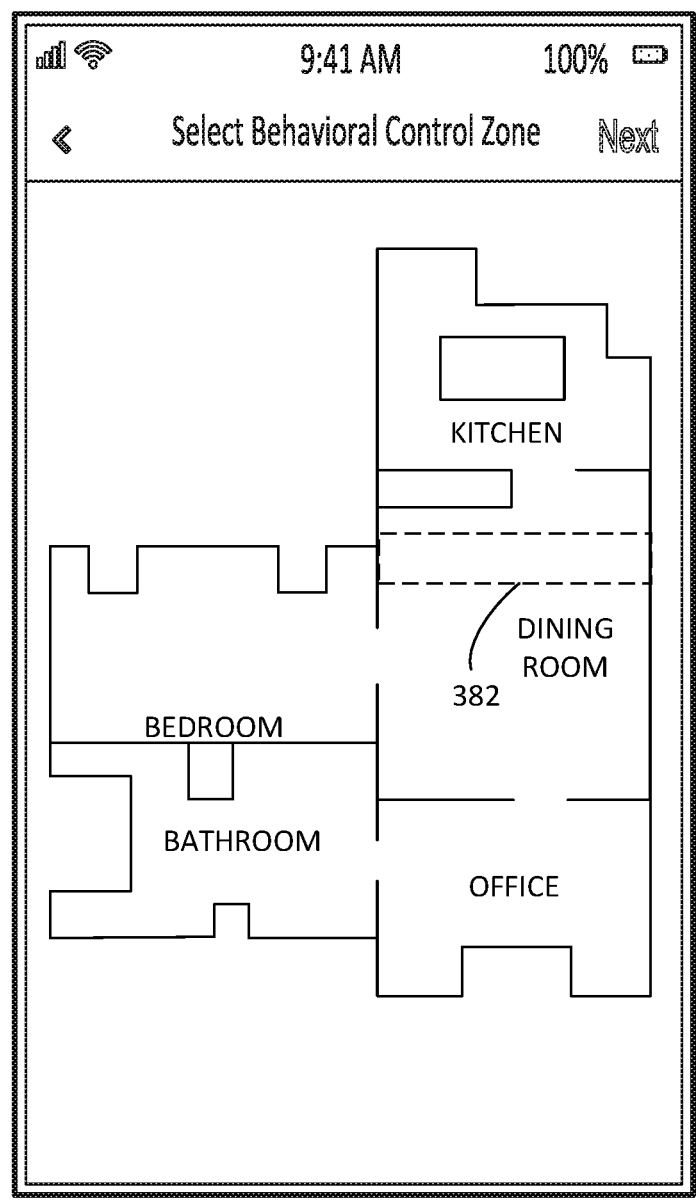
Figure 17B:
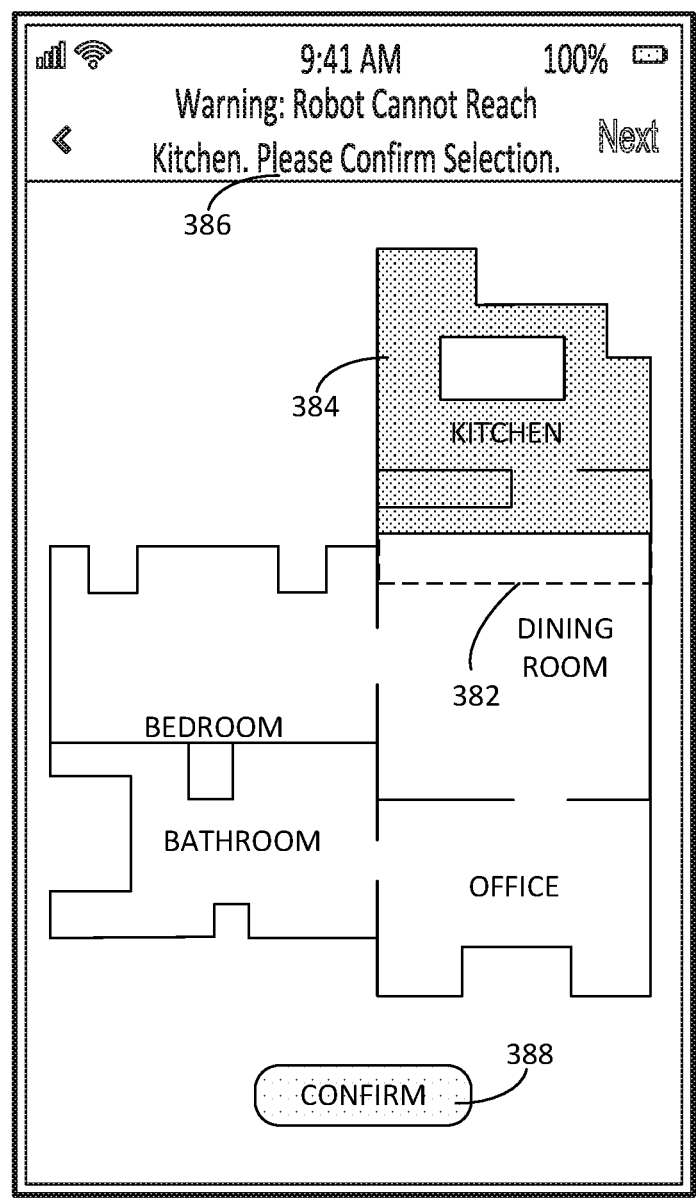

In further examples, referring to FIG. 17A, the user 30 can manually define a behavior control zone 382 that would prevent the robot 100 from traversing through a portion of the environment. Referring to FIG. 17B, the mobile device 188 can present an indicator 384 representing the portion of the environment that would be untraversable by the robot 100. The mobile device 188 can further present a warning 386 indicating to the user 30 that the robot 100 would be unable to reach a room or a portion of a room with the behavior control zone 382 defined in the manner proposed by the user 30. The user 30 can confirm the selection by pressing a confirm button 388, or otherwise return to the step of defining the behavior control zone 382 again to redefine the behavior control zone 382. In some implementations, the mobile device 188 (or other device) can recommend a behavior control zone that would not prevent the robot 100 from reaching certain parts of the environment.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

A number of implementations have been described. Nevertheless, it will be understood that various modifications may be made. Accordingly, other implementations are within the scope of the claims.

What is claimed is:

1. An autonomous mobile robot comprising:
    a drive system to support the robot above a surface, the drive system operable to navigate the robot about the surface;
    a sensor system configured to generate a signal indicative of a location of the robot on the surface; and
    a controller operably connected to the drive system and the sensor system, the controller configured to execute instructions to perform operations comprising:
        receiving a user command to define a location of a behavior control zone on the surface;
        controlling the drive system, in response to receiving the user command to define the location of the behavior control zone, to maneuver the robot to the defined location of the behavior control zone on the surface to confirm the defined location of the behavior control zone;
        after controlling the drive system to maneuver the robot to the defined location of the behavior control zone, establishing the behavior control zone on the surface; and
        after establishing the behavior control zone, in a cleaning mission, maneuvering, using the drive system, the robot about the surface and initiating a behavior in response to determining, based on the signal indicative of the location of the robot, that the robot is proximate to the behavior control zone.

2. The robot of claim 1, further comprising a light indicator system, wherein the controller is operably connected to the light indicator system, and the operations comprise activating the light indicator system in response to controlling the drive system to maneuver the robot to the defined location of the behavior control zone.

3. The robot of claim 2, wherein activating the light indicator system in response to controlling the drive system to maneuver the robot to the defined location of the behavior control zone comprise operating the light indicator system to indicate a direction of the behavior control zone relative to the location of the robot.

4. The robot of claim 2, wherein the operations comprise activating the light indicator system in response to the robot being maneuvered to the defined location of the behavior control zone.

5. The robot of claim 1, wherein controlling the drive system to maneuver the robot to the defined location of the behavior control zone comprises controlling the drive system to navigate the robot through at least a portion of the behavior control zone.

6. The robot of claim 5, wherein controlling the drive system to navigate the robot through at least the portion of the behavior control zone comprises controlling, in response to wirelessly receiving user instructions, the drive system to navigate the robot through at least the portion of the behavior control zone.

7. The robot of claim 5, wherein the portion of the behavior control zone comprises a perimeter of the behavior control zone.

8. The robot of claim 5, wherein the portion of the behavior control zone comprises a path through an interior of the behavior control zone.

9. The robot of claim 1, wherein the operations further comprise:
    transmitting mapping data to cause a mobile device to present a map of the surface, and
    receiving from the mobile device a user instruction to establish the behavior control zone.

10. The robot of claim 1, wherein controlling the drive system to maneuver the robot to the defined location of the behavior control zone comprises controlling the drive system to navigate the robot along a perimeter of the behavior control zone.

11. The robot of claim 1, wherein:
    the surface comprises a first portion having a first surface type and a second portion having a second surface type,
    the behavior control zone covers the second portion having the second surface type, and
    initiating the behavior in response to determining, based on the signal indicative of the location of the robot, that the robot is proximate to the behavior control zone comprises initiating the behavior in response to determining that the robot is proximate to the second portion of the surface as the robot maneuvers about the first portion of the surface.

12. The robot of claim 1, wherein the robot comprises a vacuum system to clean the surface, and the behavior comprises adjusting a vacuum power delivered to the vacuum system.

13. The robot of claim 1, wherein the behavior comprises adjusting a movement speed of the robot.

14. The robot of claim 1, wherein the behavior comprises adjusting a movement direction of the robot.

15. The robot of claim 14, wherein adjusting the movement direction of the robot comprises orienting the robot to enter the behavior control zone at an angle.

16. The robot of claim 1, wherein the behavior control zone is a keep-out zone, and the behavior comprises avoiding the keep-out zone.

17. The robot of claim 1, wherein the operations comprise:
controlling the drive system to maneuver the robot along a path in a first direction into the behavior control zone, and
in response to detecting that the robot is within the behavior control zone, controlling the drive system to maneuver the robot along the path in a second direction out of the behavior control zone.

18. The robot of claim 1, wherein the operations comprise:
detecting that the robot is within the behavior control zone, and
preventing initiation of an operation of the robot in response to detecting that the robot is within the behavior control zone.

19. The robot of claim 18, wherein preventing the initiation of the operation of the robot in response to detecting that the robot is within the behavior control zone comprises preventing initiation of a movement operation of the robot in response to detecting that the robot is within the behavior control zone.

20. The robot of claim 1, wherein initiating the behavior in response to determining, based on the signal indicative of the location of the robot, that the robot is proximate to the behavior control zone comprises initiating the behavior in response to determining, based on the signal indicative of the location of the robot, that the robot is within a buffer zone around the behavior control zone.

21. The robot of claim 20, wherein:
the sensor system is configured to generate data indicative of locations of the robot on the surface, and
the operations comprise estimating an uncertainty associated with the data indicative of the locations of the robot, wherein a size of the buffer zone is based on the estimated uncertainty.

22. The robot of claim 21, wherein the size of the buffer zone is proportional to the estimated uncertainty.

23. The robot of claim 20, wherein a size of the buffer zone is user-selected, the size being provided by a mobile device.

24. The robot of claim 1, wherein the behavior control zone covers a first portion of the surface containing an object, and the operations comprise:
updating the behavior control zone to cover a second portion of the surface in response to the object being moved to the second portion of the surface.

25. The autonomous mobile robot of claim 1, wherein the operations further comprise:
after controlling the drive system to maneuver the robot to the defined location of the behavior control zone and before establishing the behavior control zone, transmitting a signal, in response to the robot being proximate to the defined location of the behavior control zone, to a mobile device to request user confirmation of the defined location of the behavior control zone.

26. The autonomous mobile robot of claim 25, wherein the operations further comprise:
after transmitting the signal to the mobile device and before establishing the behavior control zone, receiving the user confirmation of the defined location of the behavior control zone,
wherein establishing the behavior control zone comprises establishing the behavior control zone in response to receiving the user confirmation of the defined location of the behavior control zone.

27. A method comprising:
presenting, on a display, a map including a representation of a perimeter of a surface in an environment;
presenting, on the display and overlaid on the map, indicators indicative of features of the environment;
receiving a user instruction to define a location of a behavior control zone on a surface;
after receiving the user instruction, transmitting, to an autonomous mobile robot and in response to receiving the user instruction to define the location of the behavior control zone, data indicative of the defined location of the behavior control zone to cause the robot to move to the defined location of the behavior control zone on the surface to confirm the defined location of the behavior control zone; and
after the robot moves to the defined location of the behavior control zone, establishing the behavior control zone to cause the robot, in a cleaning mission to initiate a behavior in response to the robot being proximate to the behavior control zone as the robot maneuvers about the surface.

28. The method of claim 27, further comprising:
after the robot moves to the defined location of the behavior control zone and before establishing the behavior control zone, requesting, in response to the robot being proximate to the defined location of the behavior control zone, user confirmation of the defined location of the behavior control zone.

29. The method of claim 28, further comprising:
after requesting the user confirmation and before establishing the behavior control zone, receiving the user confirmation of the defined location of the behavior control zone,
wherein establishing the behavior control zone comprises establishing the behavior control zone in response to receiving the user confirmation of the defined location of the behavior control zone.

30. The method of claim 27, wherein transmitting the data indicative of the defined location of the behavior control zone to cause the robot to move to the defined location of the behavior control zone on the surface to confirm the defined location of the behavior control zone comprises:
transmitting the data indicative of the defined location of the behavior control zone to cause the robot to move along at least a portion of a perimeter of the behavior control zone.

* * * * *